United States Patent
Shian et al.

(10) Patent No.: US 9,335,539 B2
(45) Date of Patent: May 10, 2016

(54) PIXEL DEVICE AND DISPLAY USING LIQUID INK AND ELASTOMERS

(71) Applicant: President and Fellows of Harvard College, Cambridge, MA (US)

(72) Inventors: Samuel Shian, Arlington, MA (US); David Clarke, Cambridge, MA (US); Roger Diebold, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 14/373,386

(22) PCT Filed: Jan. 23, 2013

(86) PCT No.: PCT/US2013/022619
§ 371 (c)(1),
(2) Date: Jul. 21, 2014

(87) PCT Pub. No.: WO2013/112498
PCT Pub. Date: Aug. 1, 2013

(65) Prior Publication Data
US 2014/0355101 A1 Dec. 4, 2014

Related U.S. Application Data

(60) Provisional application No. 61/622,856, filed on Apr. 11, 2012, provisional application No. 61/589,616, filed on Jan. 23, 2012.

(51) Int. Cl.
*G02B 1/06* (2006.01)
*G02B 26/00* (2006.01)
*G02B 3/12* (2006.01)
*G02F 1/01* (2006.01)

(52) U.S. Cl.
CPC .............. *G02B 26/005* (2013.01); *G02B 3/12* (2013.01); *G02B 26/004* (2013.01); *G02B 26/007* (2013.01); *G02F 1/01* (2013.01)

(58) Field of Classification Search
CPC ....... G02B 3/14; G02B 26/004; G02B 26/005
USPC ................................. 359/665, 666
See application file for complete search history.

(56) References Cited

U.S. PATENT DOCUMENTS

| | | |
|---|---|---|
| 2008/0297880 A1 | 12/2008 | Steckl et al. |
| 2009/0277056 A1 | 11/2009 | Peeters et al. |
| 2009/0279158 A1 | 11/2009 | Peeters et al. |
| 2010/0208328 A1 | 8/2010 | Heikenfeld et al. |
| 2011/0304905 A1 | 12/2011 | Yeo et al. |
| 2012/0013967 A1 | 1/2012 | Kim |

FOREIGN PATENT DOCUMENTS

| | | | |
|---|---|---|---|
| JP | 2009186935 A | * | 8/2009 |
| WO | 2011/020013 A1 | | 2/2011 |
| WO | WO 2011/020013 A1 | | 2/2011 |

OTHER PUBLICATIONS

International Search Report and Written Opinion for International Application No. PCT/US13/22619 mailed Apr. 17, 2013.

* cited by examiner

*Primary Examiner* — William Choi
(74) *Attorney, Agent, or Firm* — Wolf, Greenfield & Sacks, P.C.

(57) ABSTRACT

A pixel device using optically active fluid contained within elastomeric materials and actuated through dielectric elastomer membrane is disclosed. The underlying mechanism of optical contrast in this display pixel is the spread and contraction of the fluid contained within a pre-stretched elastomer membrane and a substrate. The actuation mechanism for the fluid flow is a dielectric elastomer membrane coated with compliant electrodes on both sides. When both electrodes are connected to a voltage source, the oppositely charged electrodes attract each other, compressing the sandwiched elastomer membrane in the thickness direction but increasing its lateral dimension. Due to geometrical constraint, the change in the membrane lateral dimension results in the net volume change of the fluid reservoir, causing optically active fluid to move from the display cavity into the fluid reservoir or vice versa. The variation of the amount of fluid in the display cavity corresponds to the variation of optical properties, such as contrast and color, of the pixel device.

24 Claims, 11 Drawing Sheets

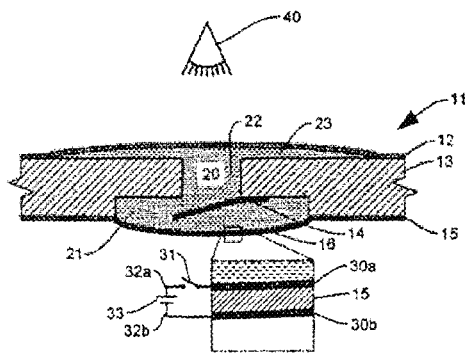
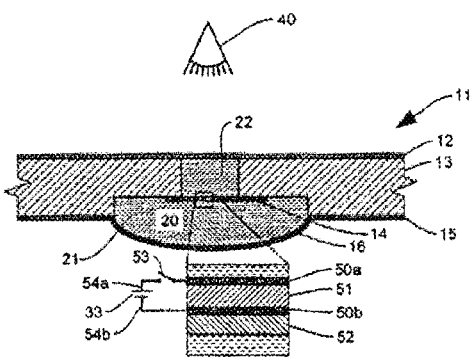
Fig. 1A　　　　　　　　　　Fig. 1C
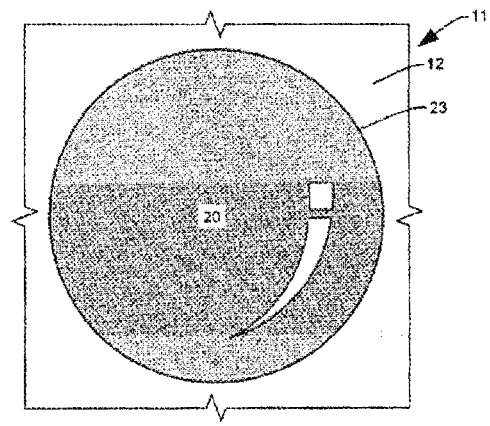
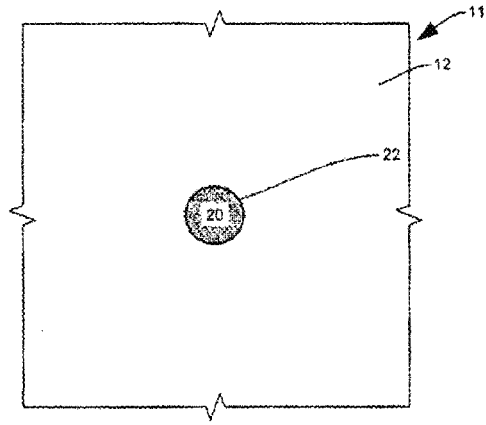
Fig. 1B　　　　　　　　　　Fig. 1D
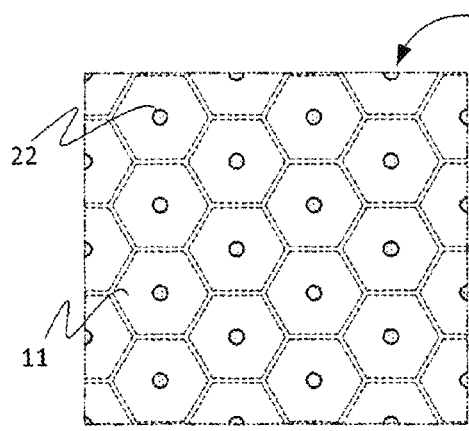
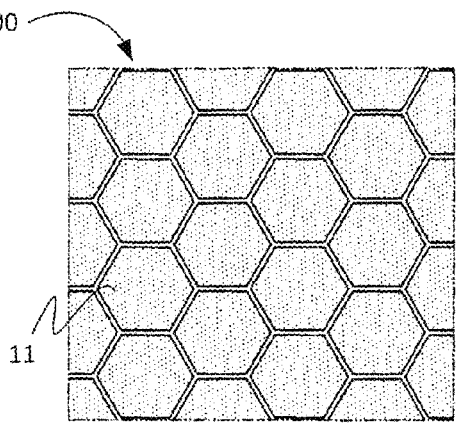
Fig. 2A　　　　　　　　　　Fig. 2B

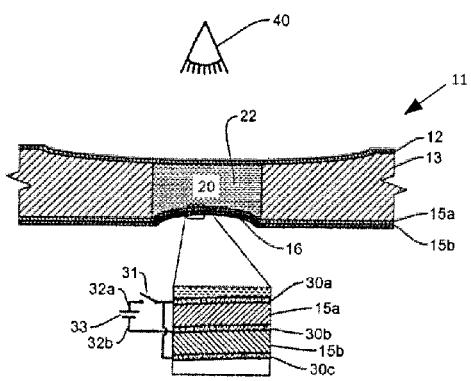
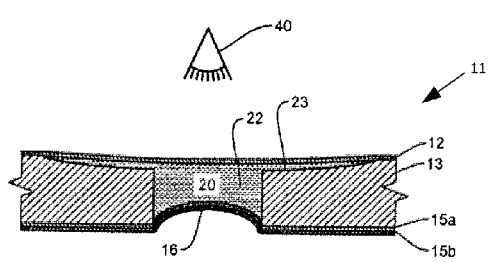
Fig. 3A Fig. 3B
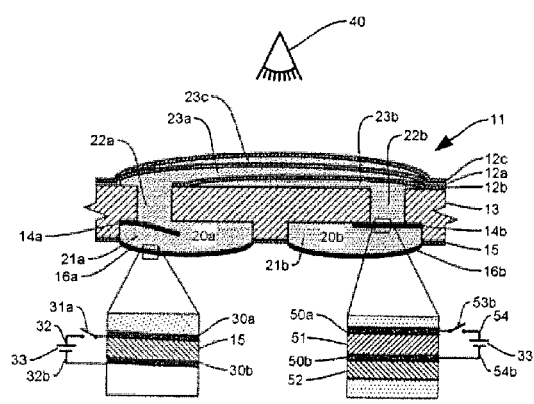
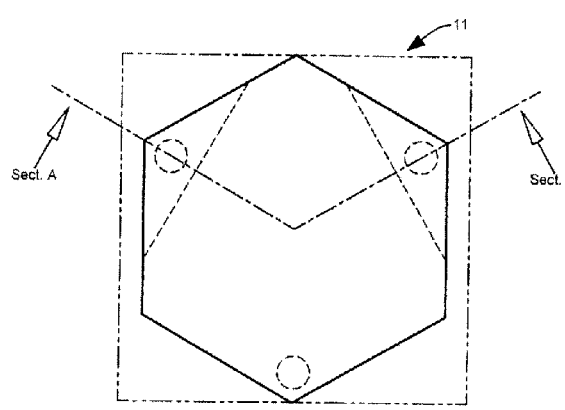
Fig. 4A Fig. 4B

PIXEL DEVICE AND DISPLAY USING LIQUID INK AND ELASTOMERS

RELATED APPLICATIONS

This utility patent application is a national stage application of International Application No. PCT/US13/22619 filed Jan. 23, 2013 and entitled "PIXEL DEVICE AND DISPLAY USING LIQUID INK AND ELASTOMERS," which claims the benefit of U.S. provisional patent application No. 61/589,616 titled "Display Pixel Using Liquid Ink And Elastomers," filed Jan. 23, 2012, and claims the benefit of U.S. provisional patent application No. 61/622,856 titled "Display Pixel Using Liquid Ink And Elastomers," filed Apr. 11, 2012, all of which are incorporated herein by reference in their entireties.

STATEMENT OF GOVERNMENT SUPPORT

This invention was made with government support under W911NF-10-1-0113 awarded by Defense Advanced Research Projects Agency. The government has certain rights in the invention.

FIELD

The present invention is in the technical field of display instruments, in particular in the field of display pixels that can be assembled into an array for presenting complex information, or for camouflage applications. Specifically, the present invention is in the technical field of fluidic display devices.

BACKGROUND

U.S. Pat. No. 7,463,398 B2, 2008, by Feenstra et al., describes an electrowetting display where the spread of two immiscible liquids: hydrophilic and hydrophobic, over a hydrophobic surface is controlled by an external voltage source. At non-energized state, the non-polar hydrophobic fluid occupies and spreads over most of the hydrophobic area. When an electrical field is applied between the polar hydrophilic fluid and the electrode underneath the hydrophobic area, the hydrophobic surface becomes more hydrophilic, increasing the wetting angle of the non-polar fluid and decreasing the wetting angle of the polar fluid. At a sufficiently high voltage, the non-polar fluid eventually contracts and is displaced by the polar fluid. Removing the electrical field will return the fluids to its initial wetting state. The spread and contraction of the non-polar fluid can be used to induce optical contrast of the electrowetting device by applying color to that fluid. One disadvantage of this type of display is the rigid nature of the structure, namely the silicon substrate on which all of the display components are laid. As a result, this type of display cannot be used for applications that need a certain degree of flexibility, such as a wrapable display. In addition, the use of water as the polar liquid limits the operating temperature from −20 to 60° C. (Heikenfeld, 2011 p 142). Furthermore, electrowetting displays are slow for large display application that requires tens of millimeter pixel sizes such as billboards, because the response time is proportional to the square of the pixel size. Another disadvantage is the presence of transparent electrode positioned between the color active component and the observer, which decreases the contrast ratio and/or the color saturation of the device.

US Published Patent Application 2010/0208328 A1, 2010, by Heikenfeld et al., describes an electrofluidic device containing polar and non-polar fluids which are driven by electrowetting. Contrary to the electrowetting device of Feenstra described above, complete displacement of non-polar fluid by the polar fluid in this device is accomplished within a viewable confined fluid chamber. According to the author, this design enables higher contrast ratio and provides more control to the gray-scale switching compared to the Feenstra design. Since the underlying physics and device construction are similar to an electrowetting display, these displays, however, share the same disadvantages mentioned above.

U.S. Pat. No. 7,619,609 B2, 2009, by Fork, describes an array of display pixels that uses rows and columns of fluid manifolds connected to centralized pumps that drive fluids into a pixel container. The amount of fluids supplied into the pixels is regulated by a series of valves controlled by electrical current. During fluid withdrawal, pressured air was delivered into the top of pixel container to push the fluid out of the pixel container. Manufacturing such a pixel display array with its multiple components (fluids, electrical signals and pressurized air) within a single pixel, will prove challenging.

SUMMARY

The inventors have recognized and appreciated that the above disadvantages may be overcome by using a fluidic display device with at least one expandable and collapsible fluid cavity that may be electrically driven by an elastomer actuator to induce alteration in at least one optical property, such as light reflectivity and/or transmissivity.

Embodiments of the present application relate to a display pixel using fluid confined within an elastomer membrane and a substrate. The substrate and the fluid may differ in at least one optical property, such as color or optical transmissivity. According to one embodiment of the present invention, there are two fluid cavities connected through a channel in each pixel: one cavity acts as a reservoir for the fluid and is hidden from a subject observer, the other acts as a display area where the fluid is spread or collapsed, and is visible to the subject observer. The reservoir cavity is enclosed with a pre-stretched dielectric elastomer membrane coated with compliant electrodes on both sides. The display cavity is enclosed with a pre-stretched, optically-transparent elastomer membrane enabling a subject observer to see the colored fluid or the substrate. The fluid can pass from the reservoir cavity to the display cavity and vice versa through the channel whose lateral area is smaller than the lateral area of the display cavity.

In the non-actuating state, both cavities contain the fluid in such amount that the elastomer membrane in the display cavity may bulge slightly, compressing the fluid, thus causing the elastomer membrane in the reservoir cavity to bulge slightly as well. In this condition, the fluid pressure is slightly higher than the ambient pressure. When a DC voltage source is connected to the electrodes on the reservoir membrane, the membrane will relax and expand, decreasing the fluid pressure, and causing the fluid to flow from the display cavity into the reservoir cavity. The decrease in the amount of fluid in the display cavity corresponds to the change in one or more spectral properties of light reflected by the pixel area to the subject observer. If the electrical potential is sufficiently large, the colored fluid will be completely withdrawn from the display cavity into the reservoir cavity, enabling the observer to directly view the underlying substrate. The pixel device operates in a multistable manner by means of a valve at one end of the connecting channel. The valve is constructed from an electroded elastomer layer attached to a stiffer elastomer layer. In the initial non-energized position, the valve covers the opening of the channel and only allows fluid to flow from the display cavity into the reservoir cavity. When a voltage source is connected to the electroded elastomer layer, the valve deflects, allowing fluid to flow back from the reservoir into the display cavity. In this instance, the observer will see the spectral property of the display return to the initial state. This mode of operation enables lower power consumption since the voltage source is needed only when changing the display state; zero power is required for maintaining a static display.

In another embodiment of the present invention, the fluid within the display pixel operates at a lower pressure compared to the ambient pressure. With this method, the display cavity is formed by a concave contour on the top of the substrate, and is enclosed with a transparent elastomer membrane. The reservoir cavity is directly connected to the display cavity on one end, and is capped with an electroded elastomer membrane on the other end. At normal state, the amount of fluid within the display is controlled so that the display cavity contains no fluid and thus the shape of the electrode membrane is concave, following the contour of the substrate. When a voltage source is connected to the electroded membrane, the membrane relaxes, and the tension from the display cavity membrane pulls on the fluid, causing the fluid to flow into the display cavity. Removing the voltage source contracts the electroded membrane, and the fluid will flow back from the display cavity into the reservoir.

In another embodiment of the present invention, three display cavities are stacked on top of each other in order to create a full color display pixel. Each display cavity is connected to a separate reservoir chamber that is enclosed within an electroded elastomer. Each display cavity contains fluids colored with dyes or pigment of one of the three primary subtractive colors: magenta, cyan, or yellow. In some embodiments, a fourth black color may also be provided. The underlying substrate is a relatively stiff elastomer and is opaque white. In its normal state, all display cavities contain fluid with different subtractive colors, and an observer will see a dark pixel. When one of the electroded elastomers in the reservoir chamber is connected to a voltage source, the fluid of one color is withdrawn, the color of the display pixel is changed as seen by the observer. If all three electroded elastomer membranes in the reservoir chambers are connected to a sufficiently high voltage source, the fluids will be withdrawn from the display cavities, and the observer will have a direct view of the underlying white substrate.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1A illustrates a cross-sectional view of a pixel device according to one embodiment of the present invention;

FIG. 1B illustrates a top view of the pixel device of FIG. 1A;

FIG. 1C illustrates a cross-sectional view of a pixel device of FIG. 1A when the fluid is withdrawn from display cavity;

FIG. 1D illustrates a top view of the pixel device of FIG. 1C;

FIG. 2A illustrates a top view of the array of pixel device when the fluid is withdrawn from display cavities;

FIG. 2B illustrates a top view of the pixel array when the fluid fills display cavities;

FIG. 3A illustrates a cross-sectional view of a pixel device according to an alternative embodiment of the present invention;

FIG. 3B illustrates a cross-sectional view of a pixel device of FIG. 3A when voltage source is connected to the dielectric elastomer;

FIG. 4A illustrates a cross-sectional view of a pixel device according to an alternative embodiment of the present invention;

FIG. 4B illustrates a top view of a pixel device of FIG. 4A;

DETAILED DESCRIPTION

Figure 5:
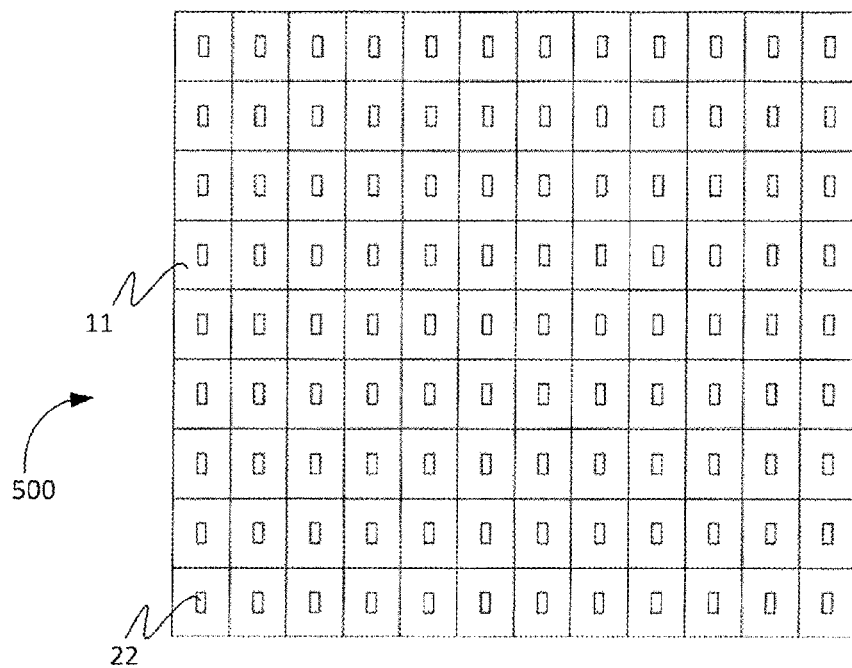
FIG. 5 illustrates a rectangular array of pixel devices in accordance with some embodiments.

In some embodiments, the underlying mechanism for optical contrast in a display pixel is the spread and contraction of an optically active fluid confined within a pre-stretched elastomer membrane and a substrate. A dielectric elastomer actuator, which is an elastomer membrane coated with compliant electrodes on both sides, may drive the fluid flow. In some embodiments, the electrodes may be connected to a voltage source such that the oppositely charged electrodes attract each other, compressing the elastomer membrane in the thickness direction. The attraction force between the two electrodes is proportional to the square of the applied voltage multiplied by the dielectric constant of the elastomer, and further multiplied by the inverse of the instantaneous thickness of the elastomer membrane. Since a dielectric elastomer may have a Poisson's ratio of nearly 0.5, a decrease in the thickness direction may induce an increase in the lateral dimensions, enlarging the lateral surface area. When the voltage source is removed or turned off, the elastomer may return to its original thickness.

One embodiment of the present invention is illustrated in FIG. 1A and FIG. 1C, cross section views of a display pixel 11. The display pixel 11 is composed of a relatively rigid substrate 13; a transparent elastomer membrane 12; a fluid 20; a valve 14; and a dielectric elastomer membrane 15 comprising, in part, an electrode portion 16 coated on at least both sides with compliant electrodes 30a and 30b. The electrodes 30a and 30b are connected to a voltage source 33 through electrically conductive wires 32a and 32b and an electrical switch 31. The substrate 13, the transparent elastomer membrane 12 and the dielectric elastomer membrane 15 form two fluid cavities, namely reservoir cavity 21 and display cavity 23, which are connected through channel 22. The transparent elastomer membrane 12 and/or the dielectric elastomer membrane 15 may be pre-stretched such that the membranes are not in a relaxed configuration. Fluid 20 may completely fill cavity 21, channel 22 and cavity 23, and the fluid may be slightly pressurized due to stress from pre-stretched membranes 12 and 15. The valve 14 may control the flow of fluid between the two cavities 21 and 23 via channel 22.

The transparent elastomer membrane 12 may have any suitable thickness. In some embodiments, the transparent elastomer membrane 12 may have a relatively thin thickness of approximately tens of microns. In other embodiments, the transparent elastomer membrane 12 may have a relatively thick thickness of approximately a few millimeters. Alternatively, the transparent elastomer membrane 12 may have an intermediate thickness of hundreds of microns.

The transparent elastomer membrane 12 may be made from any suitable material. In some embodiments, the transparent elastomer membrane 12 may be prepared from a highly transparent silicone sheet or any carbon-based elastomer that is sufficiently transparent. In some embodiments, the material may transmit >90% of light in the visible portion of the electromagnetic spectrum (e.g., 400-700 nm). Such membrane materials include, but are not limited to, silicone rubber, acrylate elastomer, natural rubber, chloroprene rubber, butyl rubber, isoprene rubber, nitrile rubber, ethylene propylene diene monomer (EPDM), acrylonitrile butadiene styrene (ABS), fluorosilicone, thermoplastic elastomer, poly (urethane) rubber, elastomer copolymers, or a blend thereof. In some embodiments, the dielectric elastomer membrane 15 may be made from the same or similar material as the transparent elastomer membrane 12. However, alternative materials may be used since the elastomer membrane 15 may be opaque. In some embodiments, the dielectric elastomer membrane 15 may be composed of a material with a high dielectric breakdown strength, i.e., on the order of 90 MV/m or more. However, embodiments are not limited to any particular dielectric breakdown level.

The compliant electrodes 30a and 30b may be formed of any suitable material. In some embodiments, the compliant electrodes 30a and 30b may be formed from a composite of an elastomer with electrically-conductive fillers. The electrically-conductive fillers may be formed from any suitable electrically conductive material, such as carbon powder, metal nanoparticles, metal nanowires, and/or carbon nanotubes. However, embodiments are not limited to any particular filler material. In some embodiments, the composites may be premixed, and then applied to the dielectric elastomer membrane 15 through stamping, printing, spraying, brushing, or drop casting. In some embodiments, the composites may be formed by first laying down the conductive component on the dielectric elastomer membrane 15. The conductive component may be laid down onto the dielectric elastomer membrane 15 in any suitable way. For example, the conductive component may be stamped, sprayed, printed or brushed onto the dielectric elastomer membrane 15. A protective elastomer or polymer overcoat may also be applied.

The valve 14 may be formed in any suitable way. One embodiment is illustrated in FIG. 1C. In the illustrated embodiment, valve 14 comprises a layer of dielectric elastomer 51, which is coated with electrodes 50a and 50b, and attached to a relatively stiff elastomer membrane 52. The dielectric elastomer 51 and electrodes 50a and 50b may be formed from any suitable material. In some embodiments, the materials for membrane 51 and electrodes 50a and 50b may be similar to the material used for the dielectric elastomer membrane 15 and electrodes 30a and 30b, respectively. The relatively stiff elastomer membrane 52 may also be formed from any suitable material. In some embodiments, the material for membrane 52 may include relatively stiff silicone rubber and flexible plastics such as, poly(ethylene) or polyester. However, embodiments of the valve 14 are not limited to any particular choice of material.

Although fluid 20 may play a passive role during electromechanical actuation, fluid 20 may play an active role in altering the optical properties of the display pixel. The fluid 20 may be any suitable fluid. In some embodiments, the fluid 20 may be chemically stable, compatible with elastomer membranes and substrates (i.e., does not react or cause significant swelling), maintain its physical fluid properties, have very low (i.e., negligible) vapor pressure, and have sufficiently low viscosity at the operating temperature (which may be between, for example, −20 to 150° C.) as to allow for relatively rapid flow through channel 22. In some embodiments, the fluid 20 may be a single component. In other embodiments, the fluid 20 may be a mixture of two or more components. The components of fluid 20 may include, but is not limited to, ethylene glycol, diethylene glycol, corn oil, or mixtures of ethylene glycol with water. Embodiments are not limited to any particular fluid.

In some embodiments, one or more substances may be added to the fluid 20 to alter the optical properties of the fluid as perceived by observer 40. The mixture of fluid 20 with one or more substances may be referred to as "ink." For example, soluble dyes and/or stable pigment dispersions may be added to the fluid. In some embodiments, the dye ink and/or pigment may be selected based on stability in the operating temperature range and ability to form an indefinitely stable solution or colloidal dispersion in the fluid. In some embodiments, nanostructured and/or microstructured particles, such as Bragg reflectors or plasmonically active structures, may be added to the fluid. In some embodiments, surfactant or surface functionalization of the pigments may be used to obtain stable dispersions in the chosen fluid. Examples of a suitable colorant may include, but are not limited to pigments and dyes.

Pigments are insoluble particles that stably disperse in a medium. Particles of pigment may require dispersing agents, surface functionalization, or surfactants to form stable colloidal dispersion in a specific fluid. Examples of pigments include, but are not limited to:
1. Opaque whites, such as Lithopore, zinc oxide, basic lead carbonates, antimony oxide, and titanium oxide.
2. Blacks, such as carbon black, aniline black, iron oxide, and iron copper chromite black.
3. Colored tones, such as Azo chromophore based pigments, phthalocyanine, quinacridone, carbozole dioxazine, lead chromates, single- or multi-component metal oxides, sulfides and sulfoselenides.
4. Special effect pigments to achieve pearlescent, luminescent, and metallizing effects, such as lead carbonates, mica, fish scale extract, particles comprised of multilayer of dielectrics, (Cu, Ag, or Mn) Zn1-xCdxS particles, quantum dots, and metal flakes.

Dyes are soluble in particular fluids. Soluble dyes include, but are not limited to, azo, anthraquinonoid, triphenylmethane, phthalocyanine, acridine, arylmethane, diazonium, quinone-imine, thiazole, and Xanthene.

The above listed examples of dyes and pigments are merely examples that could possibly be used in some embodiments. Embodiments are not limited to any particular type of pigment or dye. There are over 8100 dyes and pigments in 31 chemical categories that may be used in some embodiments.

FIG. 1A illustrates a voltage source 33, which may be any suitable voltage source. In some embodiments, a DC voltage source may be used. In particular, some embodiments may use a high voltage DC source with a small current requirement. The terminal of the voltage source 33 is connected to the compliant electrodes 30a and 30b through a pair of wire, 32a and 32b, along with a switch 31. Switch 31 may be any suitable switch. For example, it may be activated manually or controlled automatically through a computer with a suitable interface. In some embodiments, the positive and negative terminals that are connected to the electrodes may be interchangeable since the voltage may only provide an electrical field within the dielectric elastomer 15. FIG. 1C illustrates the voltage source 33 also being used to drive the valve 14. However, in some embodiments, different voltage sources may be used.

FIG. 1B illustrates a top view of the pixel device as seen by an observer 40 (shown in FIG. 1A and FIG. 1C). An area of the top cavity 23 covers most of the viewable surface of device 11 and has the optical properties of fluid 20. The shape of the top cavity 23 is not limited to any particular shape, though the top cavity 23 of the embodiment shown in FIG. 1B is illustrated as having a circular projected shape. In some embodiments, the projected shape of the top of cavity 23 is may be rectangular, hexagonal or any other shapes in order to maximize the filling fraction of the viewable area of device 11. A high filling fraction shape may be desirable when the pixels are constructed in an array to create a pattern or an image. Alternatively, the shape of the top cavity 23 may be an irregular shape. The irregularity of such a shape may be useful in an array of irregular shapes when a particular aesthetic quality of the display is desired, or the creator of the display is interested in viewing a particular shape. For example, an irregularly shaped top cavity 23 may be useful in camouflage applications.

With reference to FIGS. 1A and 1C, substrate 13 may be formed from any suitable material. In some embodiments, the substrate 13 may be constructed from a sufficiently rigid material that can hold the membranes and does not suffer significant flexure under membrane tension. In some embodiments, the substrate 13 may be non-permeable by fluid 20 and/or the optical altering agent (e.g., pigment and/or dye) it contained therein. Substrate 13 is not limited to be formed from a material of any particular transparency or opaqueness. In some embodiments, transparent materials may be used to form substrate 13. Alternatively, substrate 13 may be formed from an opaque material. In some embodiments, parts of substrate 13 may be transparent while other parts are opaque. In some embodiments, the optical properties of substrate 13, may be complementary to the fluid 20 to induce contrast change during device actuation. In some embodiments, the substrate 13 may be formed from plastic, rubber, silicone rubber, acrylic polymer sheet, natural rubber, epoxy or metal. In some embodiments, the substrate 13 may be formed from ethylene propylene diene monomer (EPDM) filled with pigments, dyes, phosphorescent materials, or other additives which impart coloration to the support. In outdoor applications, the substrate 13 may include ultraviolet stabilizing additives such as benzotriazole or any other organic or inorganic materials suitable for the purpose. However, embodiments are not limited to any particular material.

Channel 22 and reservoir cavity 21 may be fabricated within substrate 13 by any suitable method including, but not limited to, molding, photolithography, punching, conventional machining, or laser machining. The lateral size of the channel 22 may affect the contrast ratio of the device. For example, the area of channel 22 shown in FIG. 1D is one thirtieth the area of top cavity 23 when it is maximally filled with fluid 20, as shown in FIG. 1B. This particular arrangement results in a viewable contrast ratio limited to 1:30 for the embodiment of pixel device 11 shown in FIG. 1B and FIG. 1D. The size of the channel 22 may also affect the response time of the pixel device: a smaller channel size may increase the response time of the pixel 11 and vice versa. Accordingly, in some embodiments, there is may be a tradeoff between contrast ratio of a pixel and the response time of the pixel.

Embodiments are not limited to a single channel 22. For example, there may be a plurality of channels that connect cavity 21 to cavity 23. In some embodiments, channel 22 may be sub-divided into a plurality of smaller channels. In such embodiments, the visual effect to the observer 40 may be improved by, for example, increasing the contrast ratio observed by observer 40.

In some embodiments, the mechanism of actuation that causes the change in one or more optical properties of the pixel device 11 as seen by observer 40 is as follows: In the starting condition, both pre-stretched membranes 12 and 15 are in force equilibrium through force transfer by a non-compressible fluid 20, as shown in FIG. 1A. Referring to FIGS. 1A-D, when switch 31 is activated, a potential difference between electrodes 30a and 30b occurs and induces electrostatic attraction between the electrodes, compressing the sandwiched dielectric elastomer membrane 15. In some embodiments, the membrane may be non-compressible (or minimally compressible), which results in the negative strain in the thickness direction causing positive strain in the lateral dimension. This lateral strain decreases the fluid pressure in cavity 21, causing the fluid to flow from cavity 23 to cavity 21 through channel 22. If the electrical potential of the voltage source 33 is sufficiently high, a complete fluid drain from cavity 23 occurs, leaving an area the size of channel 22 filled with fluid 20, as shown FIG. 1D. Thus observer 40 sees a contrast change that is proportional to the ratio of area 23 (FIG. 1B) to area 22 (FIG. 1D). In some embodiments, the time required for fluid 20 to retract completely from cavity 23 is less than one second. When switch 31 is released, membrane 15 contracts and increases the fluid pressure in cavity 21. At this condition, valve 14 closes and prevents the fluid in cavity 21 to flow back into cavity 23. With reference to FIG. 1C, the state of the pixel may be held indefinitely at this condition, enabling zero power (or, in some embodiments, low power) operation of the pixel device 11. When switch 53 is activated, a potential difference between electrodes 50a and 50b occurs and compresses membrane 51 in the thickness direction and in turn expands membrane 51 in the lateral direction. Since dielectric elastomer membrane 51 and relatively stiff membrane 52 are mechanically coupled, the expansion of membrane 51 deflects valve 14 and creates an opening for fluid to flow from cavity 22 into cavity 23 via channel 22. When switch 53 deactivates, valve 14 returns to its original shape, closes channel 22 and stops the flow of fluid 20. In this manner, the pixel device is multistable in that any amount of fluid may be maintained in the display cavity 23 without the need to apply power. In some embodiments, the amount of fluid flowing from cavity 21 may be controlled by the magnitude of voltage source 33 and/or the activation duration of switch 53. For example, if the activation duration of switch 53 is sufficiently long, fluid 20 refills cavity 23 to the original state at which the force equilibrium between membrane 15 and 12 is achieved.

In some embodiments, an intermediate state of optical property between the extreme states shown in FIGS. 1B and 1D may be achieved by varying the amount of fluid in cavity 23. These intermediate states may represent a continuum of gray scale that may be reproduced by pixel device 11. The intermediate states may be accomplished in any suitable way. In some embodiments, the activation duration of switch 31 may be varied when the fluid flows from cavity 23 to cavity 21. Alternatively, or additionally, the activation duration of switch 53 may be varied when the fluid flows from cavity 21 to cavity 23. In some embodiments, the magnitude of voltage source 33 may be used to control additionally the fluid flow rate. For example, the higher applied voltage, the faster the fluid flows. In preferred embodiments, the maximum applied voltage should be lower than the breakdown strength of dielectric membranes 14 and 51.

FIGS. 2A-B illustrate one embodiment of an array 200 of pixel devices 11. The display cavity in each pixel device is hexagonal in shape and the pixels are arranged in close-packing in order to minimize inter-pixel-spacing, thus maximizing the surface coverage. FIG. 2A illustrates the pixel array when the fluid was withdrawn completely from the display cavities. Since the top membrane is transparent and the size of the fluid channel 22 is small, the optical contrast perceived by an observer is mostly the color of the substrate. When the display cavities are filled with fluid, as shown in FIG. 2B, the observer sees the color of the dyes or pigment of the fluid. In some embodiments, to form a pattern or an image, each pixel device of the array may be controlled independently by respective electrical signals.

Figure 6:
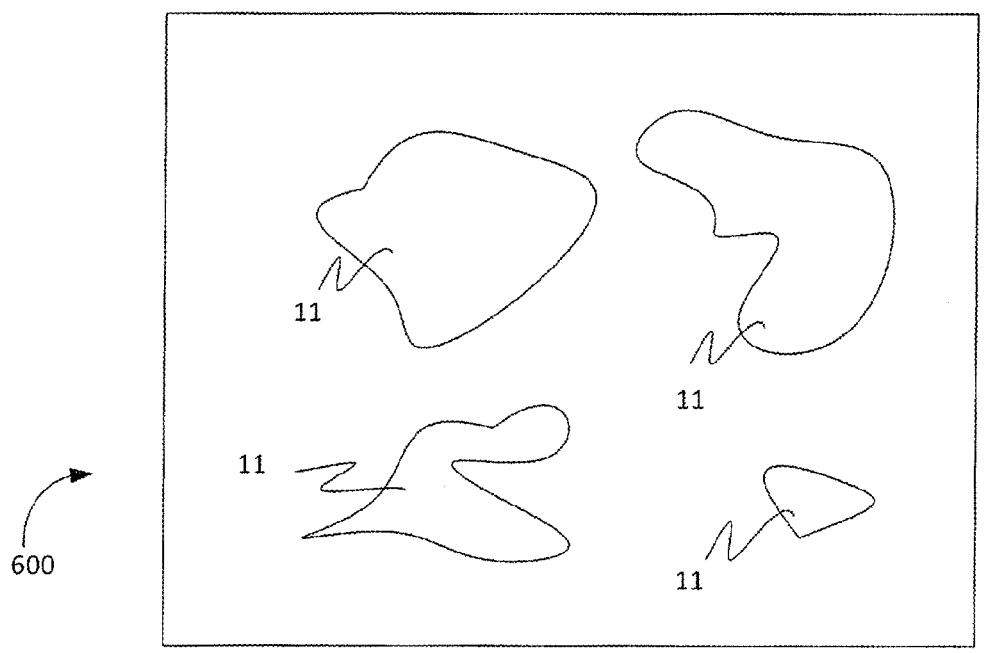
FIG. 6 illustrates an irregular array of irregularly-shaped pixel devices in accordance with some embodiments.

An array of pixel devices 11 may be formed in any suitable way and is not limited to the hexagonal arrangement described in connection with FIG. 2A-B. For example, FIG. 5 illustrates an embodiment of an array 500 of pixel devices 11 that are rectangular in shape with rectangular shaped channels 22. Embodiments are not limited to any particular number or shape of pixel devices 11. For example, FIG. 6 illustrates an embodiment of an irregular array 600 of four pixel devices 11, each with a unique irregular shape. Each of the pixel devices 11 may be any suitable shape and size and need not be the same shape and/or size of any other pixel device of the array.

FIGS. 3A-B illustrates an embodiment wherein the pixel device 11 comprises substrate 13 with recessed surface for display cavity 23, multilayered membranes 15a and 15b, dielectric elastomer membrane 15 electroded section 16, and channel 22. The upper recessed surface of substrate 13 is molded as a concave shape, so that fluid 20 may be completely withdrawn from display cavity 23. In this withdrawn state, pre-stretched membrane 12 follows the upper contour of recessed substrate 13, displacing fluid 20. In some embodiments, dielectric elastomer membrane 15 may be multilayered, so as to increase the actuation power while maintaining the same magnitude of electrical field used in the embodiment illustrated in FIG. 1A and FIG. 1C. The actuating membrane, which comprises two layers of elastomer membrane 15a and 15b sandwiched alternatingly between three layers of electrodes 30a, 30b, and 30c, is illustrated in the inset in FIG. 3A. Any suitable number of layers may be used. In some embodiments, more than two dielectric layers may be used to achieve higher energy capacity and higher actuation power. Since channel 22 functions as a fluid reservoir in the embodiment illustrated in FIGS. 3A-B, the channel 22 is relatively large in order to accommodate fluid 20 when the display cavity is emptied. In some embodiments, a transparent material may be used to form substrate 13 allowing device 11 to operate in a transmissive mode using, for example, backlighting, as described below.

In an initial state of the pixel device 11 of FIGS. 3A-B a certain amount of fluid 20 may be placed in channel 22 so that no fluid is present in the display cavity 23. The pressure of fluid 20 may be, for example, lower than the ambient pressure. When switch 31 is activated, electrostatic attractions between electrodes 30a and 30b, and between electrode 30b and 30c, squeeze membrane 15a and 15b, respectively. Since the membranes may be non-compressible (or minimally compressible), the negative strain in the thickness direction causes positive strain in the lateral dimension. This lateral strain is seen as surface area expansion of dielectric elastomer membranes 15a and 15b, causing a decrease in the fluid pressure in channel 22, and in turn, causing the fluid to flow from channel 22 to cavity 23. The amount of fluid that flows to the display cavity 23 may depend on the magnitude of voltage source 33: the higher the voltage, the more fluid fills cavity 23. Alternatively, or additionally, the amount of fluid in display cavity 23 may be controlled through a duty cycle of switch 31 using a constant voltage source 33. Upon releasing the switch, the contraction of membrane 15 withdraws the fluid back from display cavity 23 into channel 22. Compared to the previous embodiment described in connection with FIG. 1A and FIG. 1C, this embodiment lacks the multistability of the display pixel, but removes the need for a second cavity.

FIGS. 4A-B illustrates an embodiment of invention pixel device 11 comprising three display cavities: 23a, 23b, and 23c stacked vertically to form a full color display pixel. FIG. 4B illustrates a top view of the pixel device with three cavities. The sections "Sect. A" and "Sect. A'" illustrate the cross-section of the pixel device 11 that is shown in FIG. 4A. Because of the cross-sectional view, not all components related to the third cavity are shown in FIG. 4A.

Each display cavity is connected individually to reservoir chambers 21a, 21b, and 21c, through separate channels 22a, 22b, and 22c, respectively. Each reservoir chamber is capped with electroded elastomer membranes 16a, 16b, and 16c that are wired to switch 31a, 31b, and 31c, respectively. Each fluid 20a, 20b, and 20c, may be colored with different dyes or pigments. For example, each of fluids 20a, 20b, and 20c may be dyed/pigmented with one of the three primary subtractive colors. A voltage source 33 is used to provide electric potential to the membrane electrodes. A single voltage source 33 is illustrated in FIG. 4A. Embodiments are not so limited. In some embodiments, each of the three electroded elastomer membranes 16a, 16b, and 16c may be controlled by its own voltage source. Each switch may be activated to allow for combination of fluid with primary coloration to form the full color spectrum seen by observer 40. In an initial state, all display cavities may contain fluids with different subtractive colors and the observer will observe a dark or black pixel. When one of the electroded elastomers in the reservoir chamber is connected to a voltage source, the fluid of its respective color will be withdrawn, causing a color change in the display pixel. If all three electroded elastomers in the reservoir chambers are connected to a sufficiently high voltage source, the fluids will be withdrawn completely from the display cavities and the observer will have a direct view of the underlying substrate, which may be, for example, a white color. Valves 14a, 14b, and 14c are separately wired to switches 53a, 53b, and 53c, and are used to allow for directional flow of fluid from the display cavities into the reservoir cavities. The reverse flow of fluid from the reservoir cavities into the display cavities occur when switches 53a, 53b and 53c, are activated.

The pixel devices described above may be used in other applications including, but not limited to, advertising billboard, active camouflage, tunable color wall or room divider, signage, adaptive clothing, wearable displays, energy efficient windows, and a variety of other applications.

Arrays of pixel devices acting as a display according to some embodiments may include various types of lighting. Various embodiments are described in connection with FIGS. 7-11. In these embodiments, the valve 14 is not shown for the same of clarity.

In some embodiments, one or more visible light sources external to the display may be used. The external light source may be arranged in any suitable way. For example, one or more external light source may be in front of, behind, to the side of, and/or around the array of pixel devices. Alternatively, one or more light sources may be internal to the array of pixel devices.

The light source may be natural or artificial, including, but are not limited to: sunlight, incandescent bulbs, flash lamps, noble gas lighting, fiber optic lights, infrared or ultraviolet lights, fluorescent lamps, lasers, light emitting diodes, bioluminescent organisms, electroluminescent materials, scintillation, sonoluminescence, chemiluminescence, all of which may or may not be electromagnetically filtered prior to illumination of the pixel array. The electromagnetic source may be either continuous or strobed depending on the application.

The illumination of the pixel devices may be assisted by reflective layers within the pixel devices themselves. For example, embodiments may make use of specular or diffuse reflection of electromagnetic radiation in order to highlight features of the pixel array, in particular the coloration of the pixels, for a desired visual effect. In some embodiments, total internal reflection may be employed to facilitate the passage of light from the light source to the pixel array such that light can pass through the colored portion of the pixels thereby modifying the properties of the light reaching the viewer 40. For example, the property of the light being modified may be the wavelength of such light, which may be selectively absorbed by the dyed or pigmented fluid.

Figure 7:
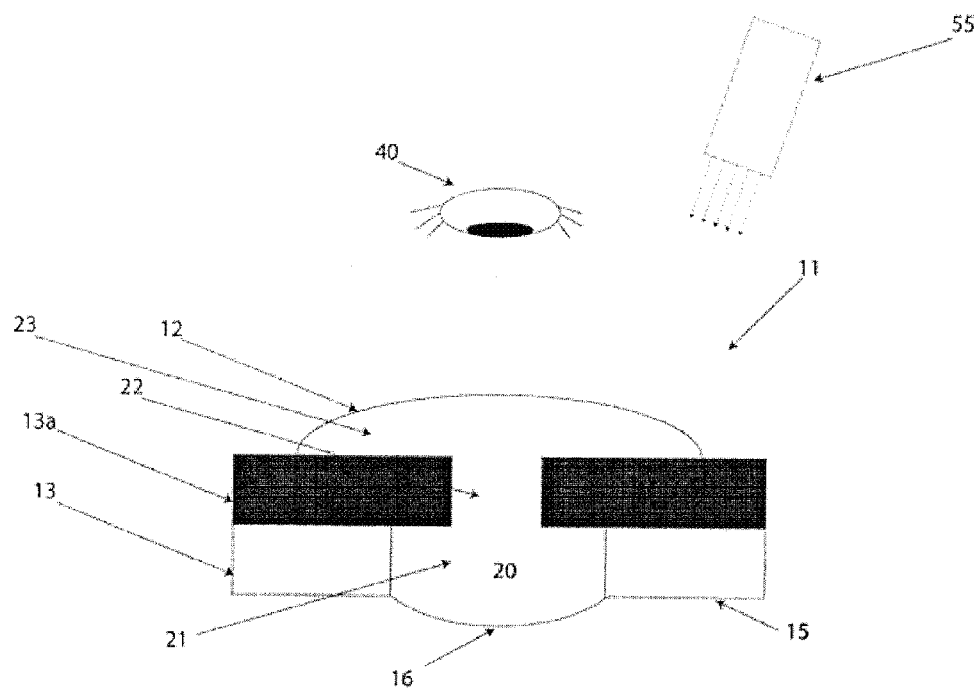
FIG. 7 illustrates an embodiment employing an external light source in front of the array of pixel devices.

FIG. 7 illustrates an embodiment where an external light source 55 is in front of the array of pixel devices. The external light source 55 is on the same side of the array as the observer 40. The embodiment of FIG. 7 illustrates a substrate 13 that is transparent, except for an opaque portion 13a located on the front side of the substrate adjacent to the display cavity 23. Embodiments of the invention are not so limited. For clarity, only a single pixel device 11 is shown in FIG. 7. However, any number of pixel devices in any arrangement may be used.

Figure 8:
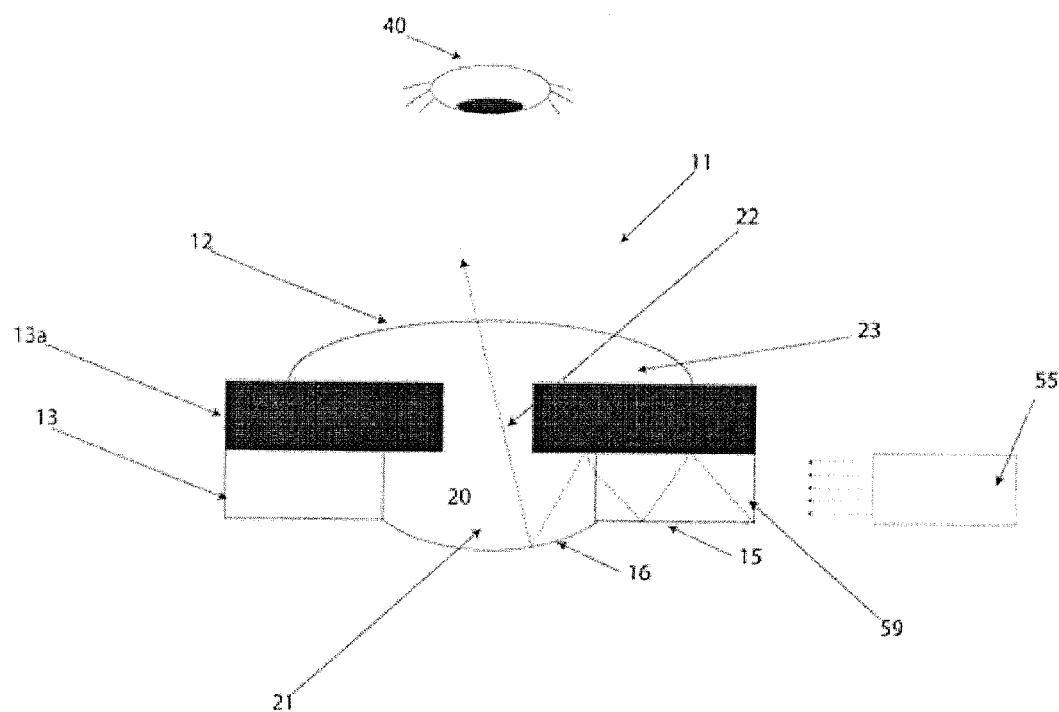
FIG. 8 illustrates an edge lit array of pixel devices according to some embodiments.

FIG. 8 illustrates an edge lit embodiment wherein the light source 55 emits light substantially parallel to the surface of the array of pixel devices. The substrate 13 acts as a waveguide 59 for the emitted light. In some embodiments, the waveguide uses total internal reflection to guide the light to the cavity 21, which holds the fluid 20. The embodiment of FIG. 7 illustrates a substrate 13 that is transparent, except for an opaque portion 13a. In some embodiments, the waveguide material may be made from elastomers or elastomer composites with cladding of high refractive index. The waveguide may be of any suitable shape. For example, the wave guide may have a rectangular solid geometry. Embodiments of the invention are not so limited.

Figure 9:
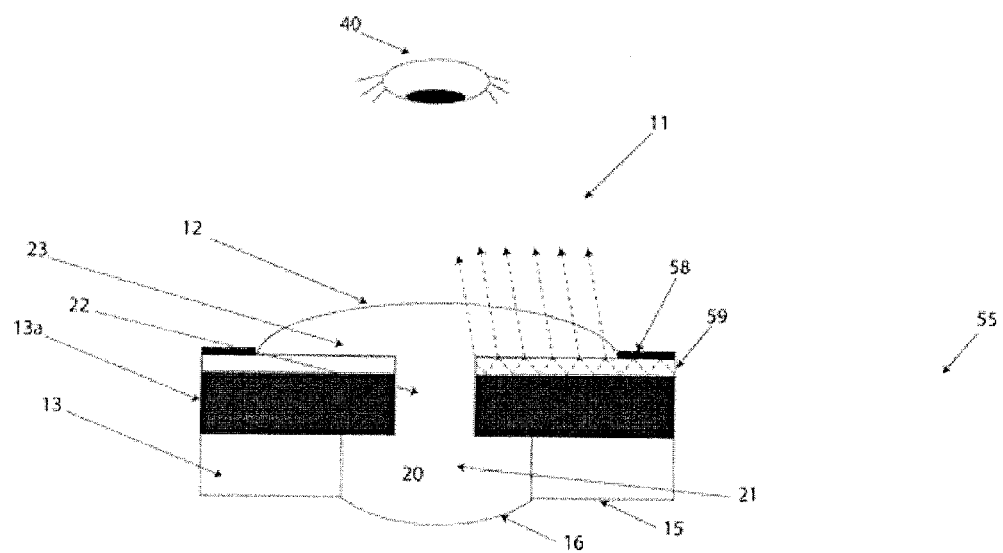
FIG. 9 illustrates an edge lit array of pixel devices according to some embodiments.

FIG. 9 illustrates an alternative edge lit embodiment. In this embodiment, the substrate 13 comprises an opaque portion 13a. Adjacent to the opaque portion is the waveguide 59. A light source 55 illuminates the waveguide from the side such that light is emitted parallel to the plane of pixel devices in the array. An optically opaque layer 58 is adjacent to the wave guide 59. The optically opaque layer 58 may be made from a material which is designed to prevent electromagnetic radiation of visible wavelengths (400-700 nm) from penetrating into the adjacent materials. The optically opaque layer 58 may be made from any suitable material. For example, the optically opaque layer 58 may be formed from plastic, rubber, metal, filled elastomers, ethylene propylene diene monomer (EPDM) filled with pigment to impart coloration to the substrate.

In the embodiment of FIG. 9, light is carried through the waveguide 59 and transmits through the display cavity 23 filled with fluid 20. The optical characteristics of the light that is transmitted through the cavity 23 are changed by the optical properties of the fluid 20. For example, the fluid 20 may absorb certain wavelengths of light resulting in the light transmitted to observer 40 being a different color than the light emitted by the light source 55.

The waveguides 59 in the above embodiments may be continuous but gradually leak light. In some embodiments, the gradual leaking of light may be facilitated by, a high refractive index coating on the waveguide (which permits its operation in total internal reflection mode) being removed selectively to permit light to 'leak' from the waveguide at the desired rate and desired locations.

Figure 10:
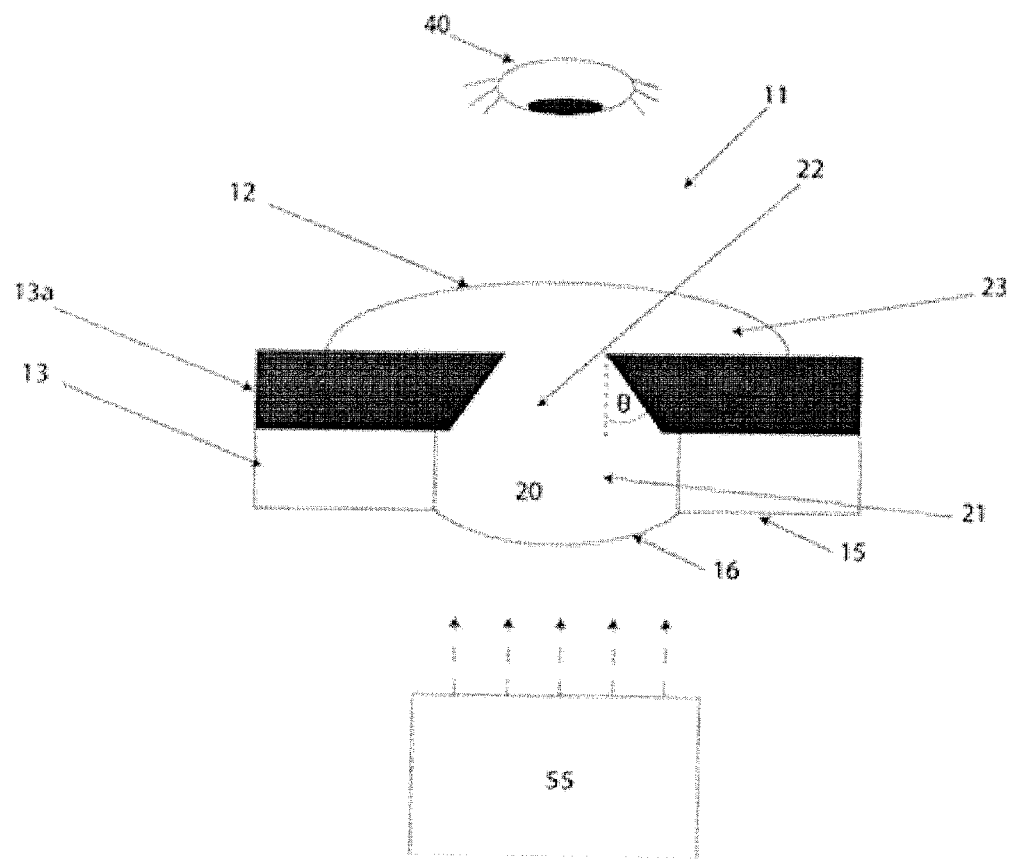
FIG. 10 illustrates a backlit array of pixel devices according to some embodiments.

FIG. 10 illustrates an embodiment of a pixel device 11 that is backlit. The light source 55 is behind the pixel device 11, opposite the observer 40 such that the emitted light passes through both the ink reservoir cavity 21 and the display cavity 23. The substrate 13 is transparent with an opaque portion 13a that is angled at an angle θ. By angling the channel 22, the amount of fluid 20 visible to the observer 40 when the fluid is withdrawn from the display cavity 23 is reduced, thereby increasing the contrast of pixel device 11. In this embodiment, the electroded portion 16 of the dielectric elastomer membrane 15 must be able to transmit light.

In some embodiments, the electroded portion 16 of the dielectric elastomer membrane 15 may transmit >90% of visible light. However, alternative embodiments may transmit less light requiring a higher brightness light source 55 for the observer 40 to receive the same amount of light.

Figure 11:
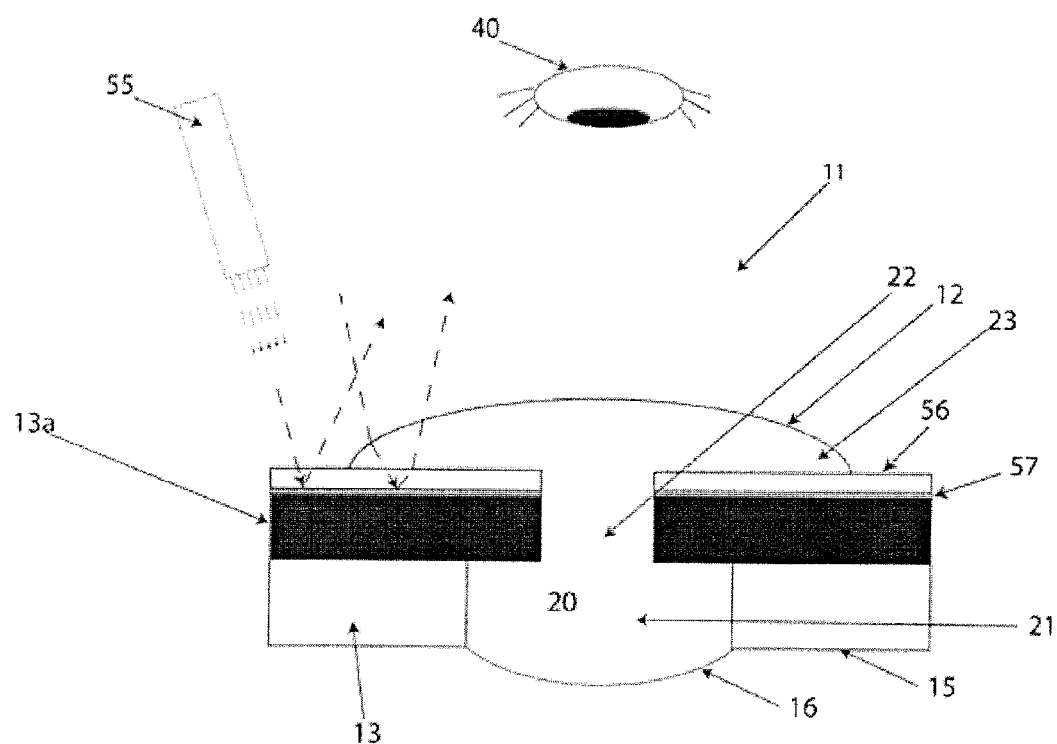
FIG. 11 illustrates a front lit array of pixel devices according to some embodiments.

FIG. 11 illustrates an embodiment of a pixel device 11 that is front lit. The pixel device 11 of FIG. 11 includes a reflective surface 57 and an optically transparent surface 56 to allow light to reflect off the pixel device 11 and back to the viewer 40.

The reflective surface 57 changes the propagation direction of incident light from light source 55 without significant losses. In some embodiments, the reflective surface 57 is made from smooth materials with, for example, an root mean square (RMS) roughness less than 100 micrometers. In some embodiments, the RMS roughness of the reflective surface 57 may be less than 1 micrometer. In other embodiments, the RMS roughness of the reflective surface 57 may be less than 1 nanometer. Any suitable material may be used for the reflective surface 57. For example, a metallic material may be used, such as aluminum or nickel. In some embodiments silicon dioxide may be used. Smooth polymer layers, defined as before, preferably silicone, acrylic, urethane elastomers, silica, glass, or other ceramics, and polymers such as poly (ethylene terephthalate), or polymer composites may also be used to impart the reflective surface 57 with reflective properties. The reflective surface 57 may be of any suitable thickness and formed in any suitable way. For example, a 200 nm thick reflective surface 57 made from aluminum may be formed using a thermal evaporator.

The optically transparent surface 56 may prevent damage to the reflective layer 57 through physical encapsulation. The optically transparent surface 56 may be made from any suitable material. For example, the optically transparent surface 56 may be made from optically transparent materials, such as silicone, acrylic, urethane elastomers, silica, glass, or other ceramics, polymers such as poly(ethylene terephthalate), or polymer composites.

Figure 12:
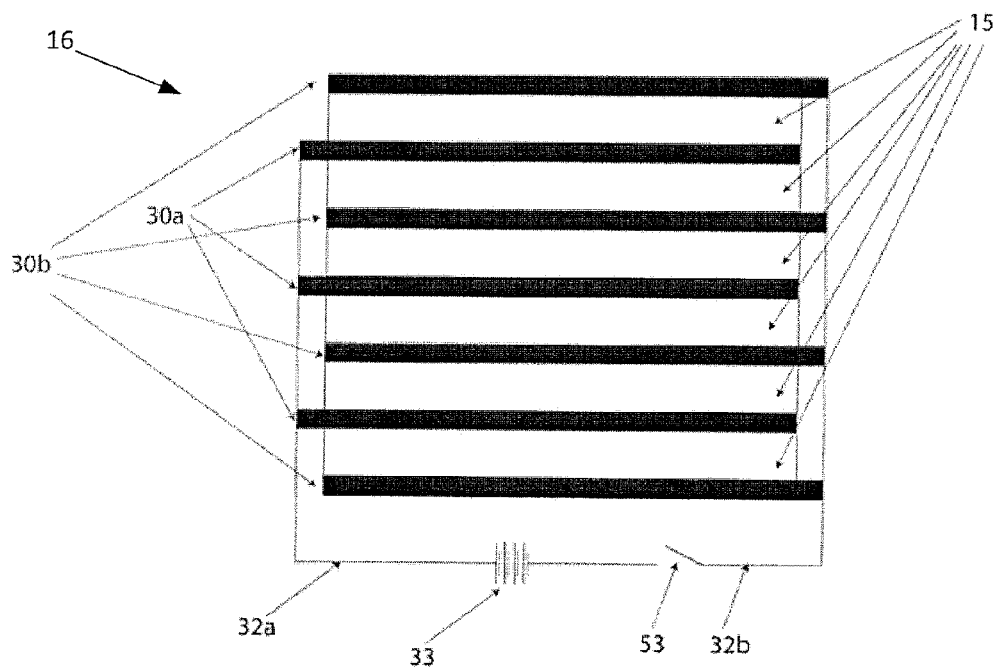
FIG. 12 illustrates an electroded part of the elastomeric membrane in an unenergized state.
Figure 13:
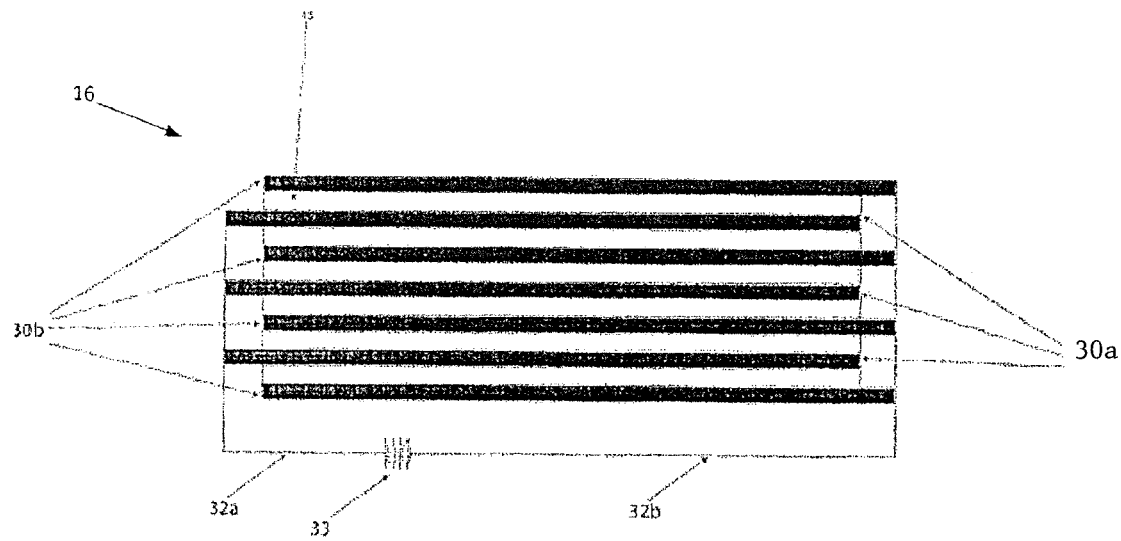
FIG. 13 illustrates an electroded part of the elastomeric membrane in an energized state.

FIG. 12 and FIG. 13 illustrate the electroded part 16 of the elastomeric membrane 15, also known as a stack actuator, in an unenergized and energized state, respectively, according to some embodiments. The electroded part 16 of the elastomeric membrane 15 may include a plurality of dielectric elastomer actuator membranes 15 combined in parallel in order to lower the voltage required for actuation and to increase actuation power generated per volt applied. The energized state of the electroded part 16 of the elastomeric membrane 15 is depicted in FIG. 11.

The compliant electrodes 30a and 30b may be made from any suitable material. In some embodiments electrodes 30a and 30b may be a fluid, such as grease or polymer, filled above the percolation threshold with particulates such as carbon black, carbon nanotubes, graphite, highly doped semiconductor particles, graphene, buckminsterfullerenes, conductive polymer particulates or dispersed conductive polymers, silver or other metal particles, or a low temperature liquid metal or metal alloy such as gallium-indium-tin alloys. When subjected to an applied electric field electrostatic charges build up which exert a compressive force on the membranes 15, causing thinning and, due to volume conservation for elastomers, a relaxation and associated area increase of the membranes 15.

In some embodiments, the elastomer dielectric membranes 15 may be monolithic, in that one dielectric membrane 15 is located between two electrodes, or a stack of subunits such that each dielectric membrane 15 actuates in concert with those directly adjacent to it in order to deliver benefits, such as greater force, speed, reliability, strain, control, or flexibility. While dielectric elastomer actuator membranes are the primary example of a method to pump fluid in order to create a visual effect within a display, there are multitudinous actuator technologies which may be used to pump fluids such as: piezoelectrics, solenoids, bimetallic strips, motors, ionic polymer/metal composites, electro-chemo-mechanical actuators, mechano-chemo-electrical actuators, conductive polymer actuators, thermomechanical actuators, chemomechanical actuators, gel actuators (polyelectrolyte or other), foam actuators, electrostrictive polymers (such as poly(vinylidene difluoride)), hydraulic, pneumatic, mechanical actuators or composites or hybrids of any of the aforementioned actuator types.

Figure 14:
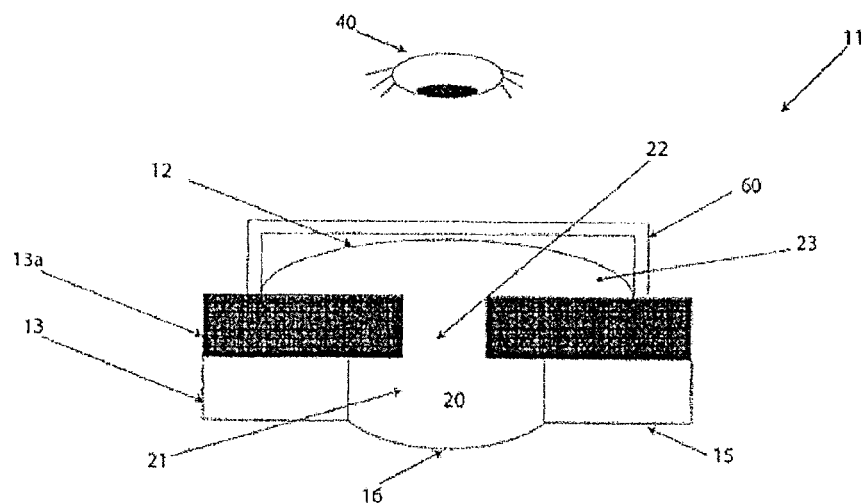
FIG. 14 illustrates a display pixel device with an optically transparent housing in an energized state.
Figure 15:
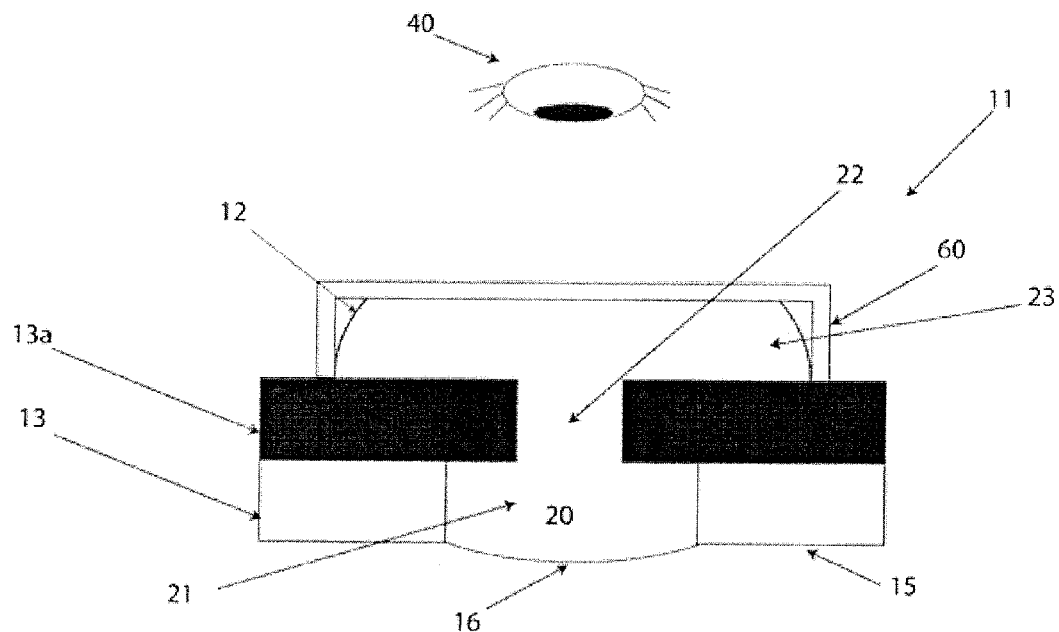
FIG. 15 illustrates a display pixel device with an optically transparent housing in an unenergized state.
Figure 16:
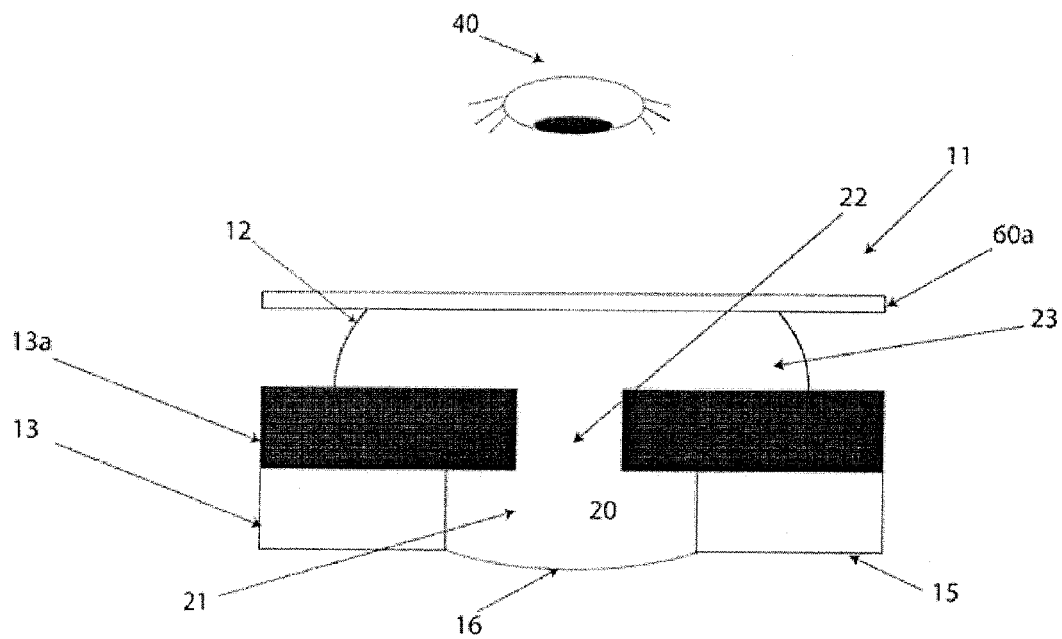
FIG. 16 illustrates a display pixel device with an optically transparent housing that encapsulates a plurality of pixel devices.

FIG. 14 and FIG. 15 illustrate an embodiment of the display pixel device 11 with an optically transparent housing 60 in its partially energized state and an unenergized state, respectively. The optically transparent housing 60 may be designed to reduce the curvature and increase the physical uniformity of the optically transparent membrane 12 from the perspective of the viewer 40. The optically transparent housing 60 may provide a physical boundary for the optically transparent membrane 12 such that the majority of the display cavity 23, is uniform in thickness. This thickness uniformity translates directly into greyscale uniformity perceived by the viewer 40 by means of the Lambert-Beer equation. FIGS. 14-15 illustrate the optically transparent housing 60 with a housing for each individual pixel device. Embodiments are not so limited. For example, a optically transparent housing 60 may encapsulate a portion of an array of pixel devices, or the entire pixel array. FIG. 16 illustrates an embodiment where optically transparent housing 60a encapsulates a plurality of pixel devices.

Figure 17:
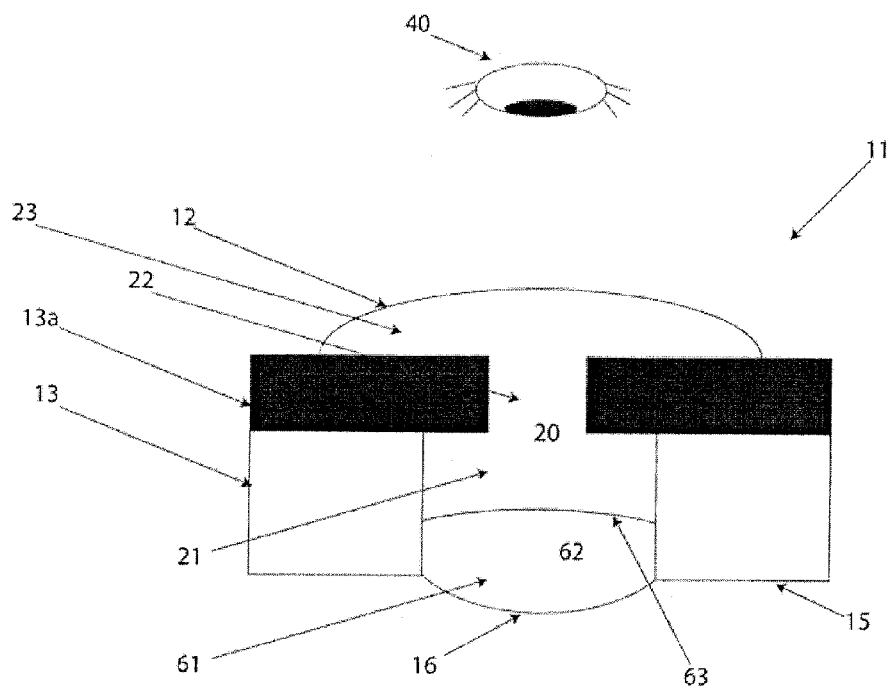
FIG. 17 illustrates a pixel device in an unenergized state with a pressure transfer chamber.

FIG. 17 illustrates an embodiment of a pixel device 11 in an unenergized state with a pressure transfer chamber 61 to facilitate actuations of the device. The pressure transfer chamber 61 may be a cavity filled with a pressure transfer fluid 62, which passes pressure changes originating from the electrostatic actuation of the dielectric elastomer membrane 16 to a pressure transfer membrane 63. The pressure change is subsequently transferred to the optically transparent elastomer membrane 12, commencing display actuation. Any suitable pressure transfer fluid 62 may be used. For example, pressure transfer fluid 62 may be comprised of oil, water, ethylene glycol, polymer solution, polymer melt, or combinations thereof. The choice of pressure transfer fluid 62 may depend on the material used for the membranes 63, 16, 15, 12 and substrate 13. Any suitable material may be used to form pressure transfer membrane 63. For example, the same materials used to form dielectric elastomer membrane 16 may be used. Embodiments are not so limited.

Figure 18:
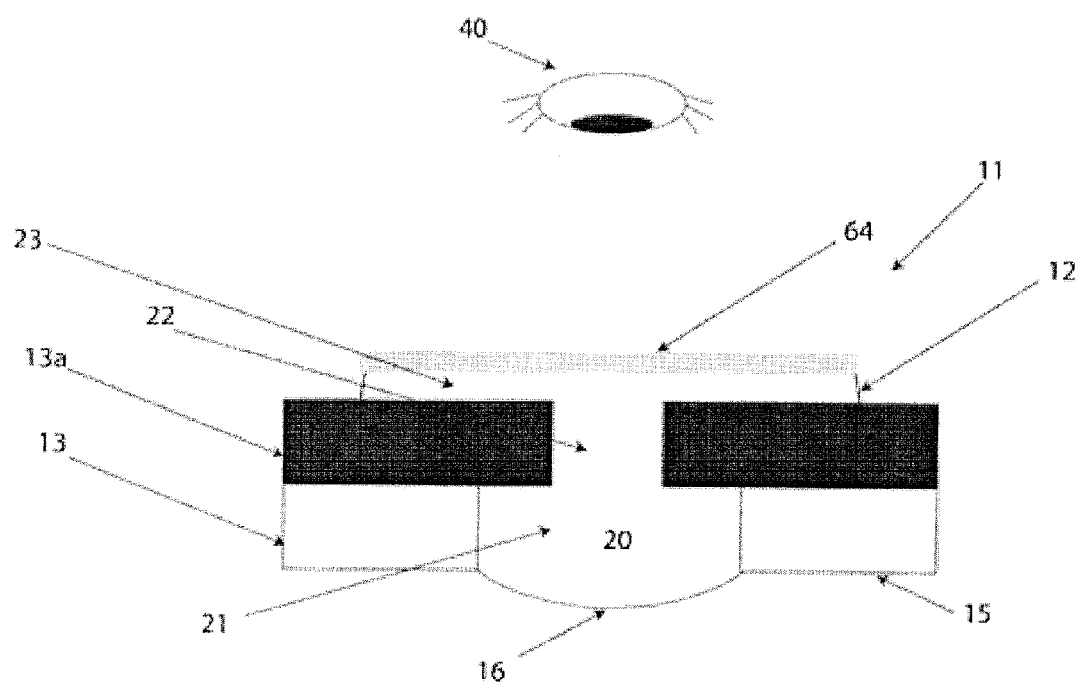
FIG. 18 illustrates a pixel device with an optically transparent, stiff cover.

FIG. 18 illustrates an embodiment of a pixel device 11 with an optically transparent, stiff cover 64. The optically transparent elastomer membrane 12 may be used around the perimeter of the stiff cover 64. Any suitable material may be used to form the stiff cover 64. For example, the stiff cover 64 may be formed from poly(vinylchloride), acetal, poly(methylmethacrylate), poly(ethylene), acrylic, polymer blends, rigid elastomers (i.e. heavily crosslinked) or glass. However, embodiments are not limited to the examples provided. Any "stiff" material may be used. In this context, "stiff" may refer to an elastic modulus at least ten times greater than that of the elastomer. In some embodiments, a stiff material for the stiff cover 64 may have an elastic modulus of approximately 1 MPa to 100 GPa. In other embodiments, the stiff cover 64 may be formed from a stiff material with an elastic modulus of approximately 100 MPa to 1 GPa.

Figure 19:
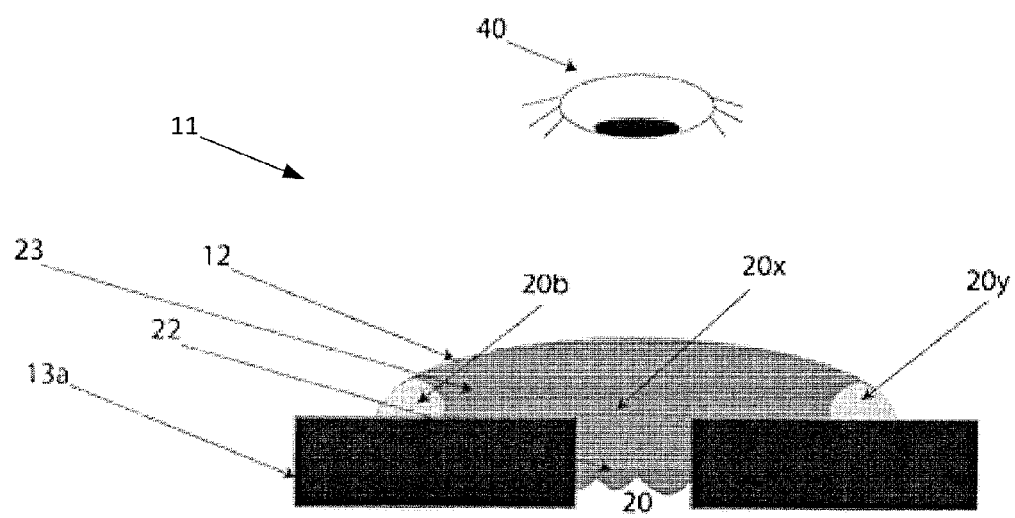
FIG. 19 illustrates a pixel device utilizing two immiscible liquids in an "on" state.
Figure 20:
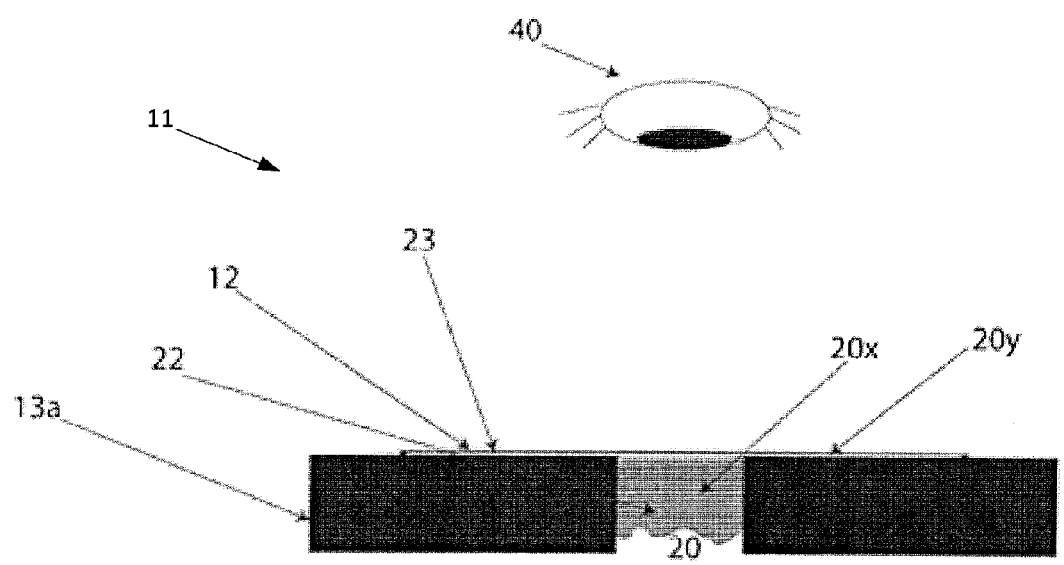
FIG. 20 illustrates a pixel device utilizing two immiscible liquids in an "off" state.

FIG. 19 and FIG. 20 illustrate an embodiment of the pixel device 11 where fluid 20 comprises two immiscible liquids 20x and 20y, one containing pigment or dye (20x) and one optically transparent (20y), to facilitate removal of the colored fluid from the display cavity 23, during actuation to an "on" state. FIG. 19 illustrates the pixel device 11 in the "on" state, whereas FIG. 20 illustrates the pixel device 11 in the "off" state. The liquids may be either hydrophobic or hydrophilic in nature. In some embodiments, the "outer" liquid 20y may be hydrophobic and the "inner" liquid 20x may be hydrophilic. Any suitable liquid may be used for the outer liquid 20y. For example, a fluorinated liquid, such as perfluoropolyether, fluorosurfactant, fluorinated hydrocarbon, Fluorinert FC-70 or another optically transparent and low surface energy liquid may be used. In other embodiments, outer liquid 20y may be a hydrocarbon liquid, hydrophobic polymer melt, or general hydrophobic solvent. Any suitable liquid may be used for the inner liquid 20x. For example, 20x may be a hydrophilic liquid containing a dissolved dye, suspended pigment, or colloidal solution to impart color. For example, inner liquid 20x may be selected from ethylene, glycol, poly(ethylene glycol), poly(vinyl alcohol), acrylic polymers, amine functionalized polymers, polyethers, poly(styrene sulfonates), vinyl acids, alcohols or blends thereof. The embodiment shown in FIGS. 19-20 may allow greater uniformity of optical absorption by ensuring that the dye or pigment is 'wiped clean' from the display cavity 23 when the actuator is energized and residual coloration may be reduced or eliminated, as perceived by observer 40. This may result in greater "on/off contrast" for the pixel device 11.

Figure 21:
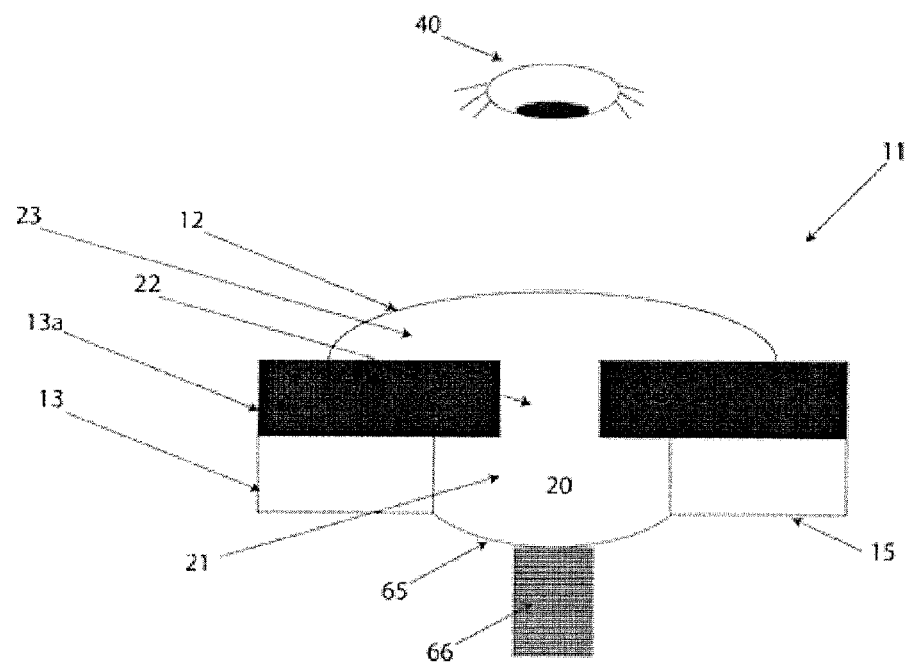
FIG. 21 illustrates a pixel device employing a solenoid and a pressure distributing membrane.

FIG. 21 illustrates an embodiment of display device 11 employing a solenoid 66 and a pressure distributing membrane 65. Instead of the dielectric elastomer actuator membrane 16 of other embodiments, the solenoid 66 drives membrane 65, which transfers and distributes pressure to the fluid 20. The pressure distributing membrane 65 may be formed from any suitable material. For example, the pressure distributing membrane 65 may be formed from a material such as poly(ethylene terephthalate), poly(methyl methacrylate), metallized polymer, highly filled and/or crosslinked elastomers (such as silicone, acrylic, urethane, etc.), or flexible inorganic sheets such as polymer laminated glass.

Figure 22:
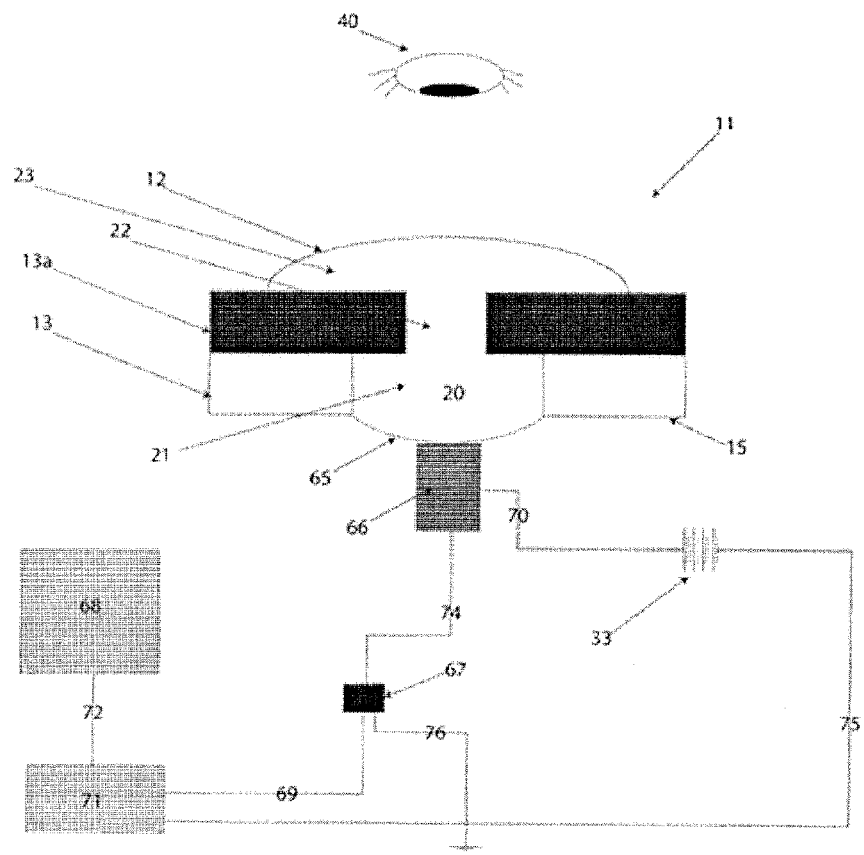
FIG. 22 illustrates a pixel device showing connections to a controller for active matrix addressing.

FIG. 22 illustrates an embodiment of pixel device 11 showing connections to a controller for active matrix addressing. As an array of pixel devices, embodiments may display an image to an observer 40 through conversion of a digital image, via computer 68 and digital to analog converter 71 (connections between 68 and 71 via 72 in any suitable way, as known in the art). The array may be controlled in any suitable way, such as through passive matrix addressing and appropriate multiplexing of the rows and columns. Display arrays may be in any suitable shape. For example, embodiments may be rectilinear or non-rectilinear. For display arrays with non-rectilinear coordinates or even a single pixel of arbitrary shape, other matrix addressing schemes may be used. Active matrix addressing may use a high voltage field effect transistor (for example, rated for operation from 30 V to 10 kV, preferably 100 V to 1 kV) and a latching capacitor within control circuit 67 at each pixel device 11 of the array to allow direct control over the operation of each electroded dielectric elastomer actuator membrane 16. The control circuit 67 controls signals originating at the computer 68, via the digital to analog converter 71, to the actuating device, in the case of FIG. 22, solenoid 66. The connections 72, 69, 76, 74, 70, and 75 facilitate this operation and are known in the art.

The following is a detailed description of a method for creating one particular embodiment of a pixel device. Embodiments are not limited to the details outlined below. A flexible substrate with thickness of 3 mm may be prepared by casting Dow Corning Sylgard 184 in 1:10 part A and B mixing ratio. After fully curing the substrate, a 1.5 mm diameter hole may be created by using a punch. An additional 3 mm thick substrate of Sylgard 184 may be prepared, and a 6-mm diameter hole may be created by a punch. With the two holes of the two substrates aligned, the two substrates may be glued using Sil-poxy silicone adhesive (Reynolds Advanced Manufacturing). A silicone rubber membrane may be prepared by mixing BlueStar's 4330 1:1 of part A and Part B. Prior to mixing, both precursor parts may be diluted to 33% w/w using xylene. After proper mixing and degassing, the solution may be poured onto a flat glass substrate and may be doctor bladed to a thickness of 0.5 mm. The membrane may be dried and cured in an 85° C. oven for 30 min. A cutout of the membrane may be stretched to 100% linear strain on a plastic frame, and a Sil-poxy glue may be applied to one side of the membrane, a circular area with a diameter of 10 mm may be left without the glue. The glued part of the membrane may be pressed onto the side of the substrate where the 1.5-mm diameter hole presents, and the unglued circular area of the membrane may be aligned with the hole on the substrate. A sheet of VHB 4905 may be equi-biaxially stretched to 150% linear strain and mounted on a plastic frame. Using a 6-mm diameter poly(dimethylsiloxane) (PDMS) stamp, silver nanowire mat electrodes may be deposited on both opposing sides of the VHB membrane, and then coated by drop casting 50 uL of a 1% PDMS in xylenes solution for protection. After the PDMS overcoat is allowed to cure at 85° C., the VHB may be glued onto the substrate using thin layer of Sil-poxy with the circular electrode area on the membrane aligned with the 6-mm diameter hole on the substrate. Once the glue cures, a fluid ink prepared by dispersing a gouache pigment in ethylene glycol may be injected using a syringe needle into the cavity in the PDMS substrate. To activate the device, a DC voltage source may be connected to both electrodes and the switch may be turned on, causing the membrane to expand and the fluid ink to move from the top cavity to the bottom cavity. If the switch is turned off, the fluid ink rapidly flows back into the top cavity.

The following is a detailed description of a method for creating an additional embodiment of an array of pixel devices. Embodiments are not limited to the details outlined below. A 100 mm by 100 mm rectangular solid substrate of thickness 2 mm with regular 2 mm diameter, right circular cylindrical spacings (representing the volumes for a plurality of pixel array channels) may be cast from a poly(urethane) elastomer (VytaFlex 60, SmoothOn, Inc.) by mixing parts A and B in a 1:1 ratio, then degassing with, for example, a vacuum and pouring into a Teflon mold before letting sit for a period of time (e.g., overnight) to cure. The support may be separated from the mold, and the support may be metallized with a 200 nm thick aluminum reflective layer 57, in a thermal evaporator before spray coating an optically transparent coating, 56, (Norland optical adhesive 81). A cured, 125% (area) pre-stretched 75 micron thick poly(urethane) elastomer membrane (VytaFlex 20, SmoothOn, Inc., doctor-bladed, let sit overnight to cure) may be pressed into contact with the Norland adhesive coated substrate using a soda-lime glass sheet to distribute the pressure evenly (150 mm by 150 mm square sheet of glass, 3 mm thick). The Norland adhesive may be cured with a 100 W ultraviolet lamp at a 30 cm distance for 2 minutes. After ultraviolet curing of the Norland adhesive to the elastomer membrane (only in the regions that would not be part of the active volume), pigment dispersed in distilled water may be added dropwise to each ink reservoir, approximately 1.5 mL per reservoir, while the membrane may be stretched mechanically in order to fit the volume of ink. A 50 micron thick poly(urethane) elastomer membrane, patterned with a wax paper stencil to include only the channel areas of the mold and the necessary connections for each row and column, (the elastomer may be prepared in the same fashion as the former poly(urethane) membrane), may be sprayed with carbon black powder (Vulcan, XC72R, Cabot, Inc.) until little or no visible light is observable. This process may be repeated on the other side of the membrane for the formation of the counter electrode. Three more dual layers of poly (urethane) and carbon black electrodes may be applied in the same fashion (electrodes applied with the stencil) such that a multilayer dielectric elastomer actuator membrane array is formed. Electrical connections may be made to each row and column by punching a metallic wire through the thickness of the dielectric elastomer actuator membrane on the edges of the array. The dielectric elastomer actuator membrane may be affixed to the support directly using Norland optical adhesive 81, applied via spray coating only to the areas of the support that are outside the channels. Connection to a digital to analog converter and its computer control allows images to be displayed.

Having herein described several embodiments of pixel devices 11, several embodiments that employ one or more pixel devices 11 are described below. For example, embodiments may include a large area display used to convey images or messages to viewers. The types of displays which may include:
1. Full color displays, wherein each pixel can display a wide variety of colors, which may make use of overlapping pixel devices.
2. Multi-color displays, wherein each pixel only displays one color, but each array of pixels may include individual pixels or areas within that array which are different colors
3. Single color displays, wherein all pixels in the array only display only one color.

The uniquely flexible design of embodiments of the present application allows application in new situations unavailable to prior display technology. Some example settings where embodiments may be employed include:
1. Digital signage, either outdoor or indoor. Digital signage for transportation hubs (airports, train stations, ferries, etc.), commercial entities (commercial logos, gas station signs, etc.), digital billboards, time keeping, video display, optical switching through modification of color (entertainment purposes). Advertising, promotional, or purely informational signage are all intended uses of the invention.
2. Active camouflage for vehicles, buildings, personnel or other objects which require visual inconspicuousness. Military applications of camouflage are also included in addition to commercial or personal use.
3. Rapidly deployable signage (for disaster relief, emergency situations, etc.).
4. Architectural installations to buildings or other objects for primarily aesthetic reasons.
5. Traffic signs, which include traffic lights/signals, traffic direction signs on highways or other roads, on airport runways, etc.

Having thus described several aspects of at least one embodiment, it is to be appreciated that various alterations, modifications, and improvements are possible.

For example, modular assembly may be used to "tile" embodiments together by electrically connecting embodiments together by means of wires or other interconnects as to permit the assembly of an arbitrarily large pixel array.

The above-described membranes may be comprised of monolithic or a series of laminates to impart environmental stability, mechanical integrity, customizable mechanical or chemical properties, and aid in ease of manufacture.

The same concepts of stacked dielectric elastomer actuator membranes, valving, lighting, pressure transfer, and actuation in general may be employed for either the full color display, multi-color display, or monochromatic display modes.

Bonding may occur with adhesives or physical curing of one material onto the next through diffusional, mechanical, chemical or any other type of adhesion.

Actuation using dielectric elastomer actuator membranes may be replaced with other actuators, including, but not limited to: piezoelectrics, solenoids, bimetallic strips, motors, ionic polymer/metal composites, electro-chemo-mechanical actuators, mechano-chemo-electrical actuators, conductive polymer actuators, thermomechanical actuators, chemomechanical actuators, gel actuators (polyelectrolyte or other), foam actuators, electrostrictive actuators, hydraulic, pneumatic, mechanical actuators or composites or hybrids of any of the aforementioned actuator types.

The pixel, when viewed from the observer's perspective, does not necessarily need to be round, square, or any particular shape. The pixels do not necessarily need to be in an array either. Part of the flexibility of the present invention is the ability to design arbitrary shapes or designs in arbitrary sizes (from ~1 $mm^2$ active area to 100 $m^2$ active area as a ballpark range; embodiments may be on the 3 $mm^2$ to 100 $mm^2$ range for a single pixel). For example, a single pixel could be shaped in the form of the Coca-Cola insignia and be actuated to 'blink' on and off periodically, rather than being comprised of several sub-pixels.

Embodiments using stacked of active volumes are not limited to any number of active volumes (e.g., three active volumes are described above, one for each of cyan, magenta and yellow). For example, it is common to use cyan, magenta, yellow, and black for subtractive displays or images in order to create greater richness of color and a higher quality image overall. In addition, various inks allow the creation of higher quality images in the printing community and the same principle applies here. For example, a single pixel comprised of 6-8 active volumes would allow the use of 6-8 separate inks, resulting in a greater ability of the device to display more colors found on the CIE color gamut.

To prevent diffusion or permeation of fluid 20 through the various parts, the parts of embodiments of the invention may be optimized to minimize loss of the liquids over time. This may be accomplished through modification of the fluid molecular weight, the composition of the membranes or supports, or through modification of the geometry of the pixel or array. Preferably, the membrane and support materials may be comprised of a composite or laminate with at least one component imparting high resistance to permeation of the fluid 20.

Having herein described several embodiments, several advantages of embodiments of the present application should be apparent. One advantage is that embodiments may be made entirely from elastomeric components, which are flexible, deformable, and foldable. Current display technologies rely on rigid substrates such as silicon, glass, or plastic. While silicon and glass substrate are well known for their inflexibility, display pixels made from plastic substrates, such as organic light emitting diodes (OLEDs), have some flexibility although limited to only one bending plane and relatively large bending radii compared to the thickness of the display assembly. Such limitations prohibit the use of those displays where conformal or wrapable application on some surface is required. Embodiments of the present application may not have such limitations because flexible and stretchable components may be used.

Because of the use of flexible materials, embodiments may retain their mechanical compliance after manufacture, thus permitting use as a pixel array for facile assembly through conformal coverage of complex or non-planar surfaces, such as building corners, spherical objects, vehicles, etc.

Some embodiments may advantageously use low density and lightweight materials in addition to the lack of requirement of a glass panel (necessary in liquid crystal display (LCD) and other display technologies) thereby allowing the present invention to possess a low mass per area relative to LCD, light emitting diode (LED), and other technologies. This advantage may afford savings in assembly, manufacture, transportation, and structural support, among others.

The materials used for fabrication of some embodiments may be inexpensive and readily available, allowing for inexpensive production without the need for clean rooms. On the other hand, LEDs necessarily require cleanroom processing of semiconductors which is typically an expensive undertaking.

Some embodiments may operate in extreme environments. For example, the physical properties of silicone elastomers may be extremely stable, from approximately −100° C. to 250° C. These stable materials may be used to construct many of the parts of some embodiments, such as the dielectric elastomer membrane, optically transparent membranes, adhesive between the membranes and the support, valves, etc.

Some embodiments have a low operating cost, because less heat is generated requiring less temperature control for cooling (as oppose to heat generated by LED displays, which typically require significant investment in cooling infrastructure and energy costs).

Further, the present invention requires no internal light source and is multistable: displaying a static image in daylight consumes zero power for this display pixel. Without having a transparent conducting electrode layer between the colored fluid and subject observer, this pixel device potentially has a high contrast ratio. Indium tin oxide (ITO), the most commonly used transparent conductor, has high refractive index of 1.8-2.0, causing significant Fresnel reflection at the interface. The absence of high refractive index layer enables full color display with high color saturation by stacking pixels of different colors, e.g., ~100% theoretical color saturation is possible through stacking CMY pixels. Furthermore, the display pixel has a wide range of operating temperatures since it is not limited to a certain type of fluid as is in other electrofluidic displays. The present invention can also be used for large display applications such as signage and billboards, since its pixel size can be made very large and has excellent viewing angle.

In a broad embodiment, the present invention is a display pixel array that uses dielectric elastomer actuators to spread and collapse an optically active fluid so that a subject observer can observe a contrast change during actuation.

This invention is not limited in its application to the details of construction and the arrangement of components set forth in the foregoing description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A flexible display comprising:
   a fluid-filled cavity;
   a dielectric elastomer, coupled to the cavity; and
   electrodes attached to opposing sides of the dielectric elastomer, wherein an electric potential applied across the electrodes causes the dielectric elastomer to deform, thereby causing the fluid to flow, thereby altering an optical property of the display.

2. The display as claimed in claim 1, wherein the display relies only on ambient light.

3. The display as claimed in claim 1, further including a substrate, coupled to the cavity, wherein the substrate and the fluid differ in at least one optical property.

4. The display as claimed in claim 3, further including a substantially transparent viewing membrane through which a viewer may view the display.

5. The display as claimed in claim 4, wherein the electric potential compresses the dielectric elastomer in a thickness direction.

6. The display as claimed in claim 4, wherein the dielectric elastomer is located on a substantially opposite side of the cavity from the viewing membrane.

7. The display as claimed in claim 1, including up to three fluid-filled cavities.

8. The display as claimed in claim 1, wherein the display is made, at least in part, from a flexible, non-brittle material.

9. The display as claimed in claim 1, wherein the electrodes form coatings on opposing sides of the dielectric elastomer.

10. The display as claimed in claim 1, wherein the cavity includes a display cavity and a reservoir cavity connected to one another by a channel through which the fluid can flow.

11. The display as claimed in claim 1, wherein the fluid includes liquid ink.

12. The display as claimed in claim 11, wherein the fluid includes colored ink.

13. The display as claimed in claim 12, wherein the display includes four cavities, a first cavity including cyan ink, a second cavity including magenta ink, a third cavity including yellow ink, and a fourth cavity including black ink, enabling the display to illustrate a full spectrum of visible colors.

14. The display as claimed in claim 1, wherein the cavity has adaptive volume to accommodate a variable amount of fluid.

15. The display as claimed in claim 1, wherein the dielectric elastomer comprises transparent silicone.

16. The display as claimed in claim 1, wherein the fluid includes a single polar or non-polar fluid.

17. The display as claimed in claim 1, wherein the fluid includes both a polar fluid and a non-polar fluid.

18. The display as claimed in claim 1, wherein the display is backlit.

19. The display as claimed in claim 1, wherein the display is side lit.

20. A display comprising a plurality of pixel devices, each pixel device comprising:
   a fluid-filled cavity;
   a dielectric elastomer, coupled to the cavity; and
   electrodes attached to opposing sides of the dielectric elastomer, wherein an electric potential applied across the electrodes causes the dielectric elastomer to deform, thereby causing the fluid to flow, thereby altering an optical property of the pixel device.

21. A display as claimed in claim 20, wherein the display is applied to an article enabling the article to be camouflaged by the display.

22. A display as claimed in claim 20, wherein the display is flexible.

23. A display as claimed in claim 20, wherein each pixel of the display is an irregular shape.

24. A display as claimed in claim 23, wherein the plurality of pixels are laid out in an irregular pattern.

* * * * *